United States Patent
Jang et al.

(10) Patent No.: US 12,047,691 B2
(45) Date of Patent: Jul. 23, 2024

(54) IMAGE SENSOR, IMAGE PROCESSING APPARATUS, AND IMAGE PROCESSING METHOD

(71) Applicant: SAMSUNG ELECTRONICS CO., LTD., Suwon-si (KR)

(72) Inventors: Chanyoung Jang, Pohang-si (KR); Hee Kang, Hwaseong-si (KR); Seongwook Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/870,175

(22) Filed: Jul. 21, 2022

(65) Prior Publication Data

US 2023/0023853 A1  Jan. 26, 2023

(30) Foreign Application Priority Data

Jul. 21, 2021 (KR) .......................... 10-2021-0096018

(51) Int. Cl.
*H04N 25/13* (2023.01)
*H04N 25/702* (2023.01)

(52) U.S. Cl.
CPC ........... *H04N 25/13* (2023.01); *H04N 25/702* (2023.01)

(58) Field of Classification Search
CPC .... H04N 25/13; H04N 25/702; H04N 23/843; H04N 25/704; H04N 25/11; H04N 23/54; H04N 23/57; H04N 23/665; H04N 25/70
See application file for complete search history.

(56) References Cited

U.S. PATENT DOCUMENTS

| | | |
|---|---|---|
| 9,179,113 B2 | 11/2015 | Tachi |
| 10,104,324 B2 | 10/2018 | Hirota |
| 10,863,148 B2 | 12/2020 | Chuang et al. |
| 2018/0357750 A1* | 12/2018 | Chen ..................... G06T 3/4038 |
| 2019/0139189 A1 | 5/2019 | Srinivasamurthy et al. |
| 2020/0077026 A1 | 3/2020 | Jeong et al. |
| 2021/0006755 A1 | 1/2021 | Kim et al. |
| 2023/0026814 A1* | 1/2023 | Wang ..................... H04N 25/77 |
| 2023/0261017 A1* | 8/2023 | Inoue .................... H01L 27/146 257/428 |

FOREIGN PATENT DOCUMENTS

JP 6596760 B1 10/2019

* cited by examiner

*Primary Examiner* — Michael E Teitelbaum
(74) *Attorney, Agent, or Firm* — Sughrue Mion, PLLC

(57) ABSTRACT

An image sensor includes a pixel array including a plurality of pixels provided in a plurality of rows and a plurality of columns, and a signal processor configured to process first image data generated by the pixel array to generate a plurality of pieces of first full color image data, wherein the signal processor is further configured to split the first image data into a plurality of pieces of phase data, remosaic-process each of the plurality of pieces of phase data to generate a plurality of pieces of color phase data, merge the plurality of pieces of color phase data corresponding to a same color, respectively, to generate a plurality of pieces of preliminary color data, and compensate for the plurality of pieces of preliminary color data to generate the plurality of pieces of first full color image data.

17 Claims, 22 Drawing Sheets

IMAGE SENSOR, IMAGE PROCESSING APPARATUS, AND IMAGE PROCESSING METHOD

CROSS-REFERENCE TO RELATED APPLICATION

This application is based on and claims priority under 35 U.S.C. § 119 to Korean Patent Application No. 10-2021-0096018, filed on Jul. 21, 2021, in the Korean Intellectual Property Office, the disclosure of which is incorporated by reference herein in its entirety.

BACKGROUND

The present disclosure relates to an image sensor, an image processing apparatus, and an image processing method, and more particularly, to an image sensor that processes image data generated by the image sensor including a color filter array, an image processing apparatus, and an image processing method.

Image processors provided in electronic devices, such as cameras, smartphones, and the like, perform an image processing operation of changing a data format of image data generated by an image sensor into a data format such as RGB, YUV, or the like, removing noise of the image data and adjusting brightness. Recently, as the demand for high-quality and high picture quality photos and videos increases, overhead is applied to the image processor, which causes inefficient power consumption of the image processor and degradation of photo and image quality.

SUMMARY

Example embodiments provide an image sensor in which image processing speed may be increased and hardware configuration may be simplified, an image processing apparatus, and an image processing method.

According to an aspect of an example embodiment, there is provided an image sensor including a pixel array including a plurality of pixels provided in a plurality of rows and a plurality of columns, and a signal processor configured to process first image data generated by the pixel array to generate a plurality of pieces of first full color image data, wherein the signal processor is further configured to split the first image data into a plurality of pieces of phase data, remosaic-process each of the plurality of pieces of phase data to generate a plurality of pieces of color phase data, merge the plurality of pieces of color phase data corresponding to a same color, respectively, to generate a plurality of pieces of preliminary color data, and compensate for the plurality of pieces of preliminary color data to generate the plurality of pieces of first full color image data.

According to an aspect of an example embodiment, there is provided an image processing apparatus including a signal processor configured to process first image data of a (2n)×(2n) matrix pattern output from an image sensor, where n is a natural number, wherein the signal processor is configured to split the first image data into a plurality of pieces of phase data, remosaic-process each of the plurality of pieces of phase data to generate a plurality of pieces of color phase data, merge the plurality of pieces of color phase data corresponding to a same color, respectively, to generate a plurality of pieces of preliminary color data, and compensate for the plurality of pieces of preliminary color data to generate a plurality of pieces of first full color image data.

According to an aspect of an example embodiment, there is provided an image processing method including splitting image data into a plurality of pieces of phase data, remosaic-processing each of the plurality of pieces of phase data to generate a plurality of pieces of color phase data, merging the plurality of pieces of color phase data corresponding to a same color to generate a plurality of pieces of preliminary color data, and compensating for the plurality of pieces of preliminary color data to generate a plurality of pieces of full color image data.

BRIEF DESCRIPTION OF THE DRAWINGS

Example embodiments of the present disclosure will be more clearly understood from the following detailed description taken in conjunction with the accompanying drawings in which.

DETAILED DESCRIPTION

Hereinafter, example embodiments will be described in detail with reference to the accompanying drawings.

Figure 1:
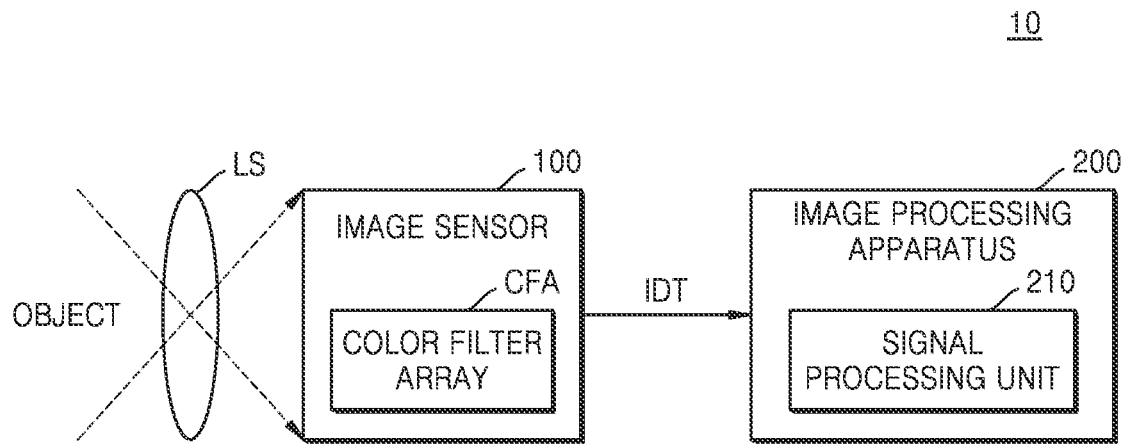
FIG. 1 is a block diagram illustrating an image processing system according to an example embodiment.

FIG. 1 is a block diagram illustrating an image processing system 10 according to an example embodiment.

The image processing system 10 may be implemented by an electronic device that performs an operation of capturing an image, displaying the captured image, or performing the captured image-based operation. The image processing system 10 may be implemented by, for example, a personal computer (PC), Internet of Things (IoT), or a portable electronic device. The portable electronic device may include a laptop computer, a cell phone, a smartphone, a tablet PC, a personal digital assistant (PDA), an enterprise digital assistant (EDA), a digital still camera, a digital video camera, an audio camera, a portable multimedia player (PMP), a personal navigation device (PMD), an MP3 player, a handheld game console, an e-book, a wearable device, or the like. The image processing system 10 may also be mounted on or included in an electronic device, such as a drone or an advanced drivers assistance system (ADAS), or an electronic device provided as a component provided in a vehicle, furniture, a manufacturing facility, a door, various measuring instruments, or the like.

Referring to FIG. 1, the image processing system 10 may include an image sensor 100 and an image processing apparatus 200. The image processing system 10 may further include other configurations such as displays, user interfaces, and the like. The image processing apparatus 200 may include a signal processing unit 210. The image processing apparatus 200 or the image processing system 10 may be implemented by a system on chip (SoC).

The image sensor 100 may convert an optical signal reflected from an object through an optical lens LS into an electrical signal and may generate and output image data IDT based on electrical signals. The image sensor 100 may include a color filter array (CFA) having a certain pattern and may convert an optical signal into an electrical signal using the CFA. In an example embodiment, the CFA may be configured to support next-generation pixel technology, such as a tetra pattern or a hexadeca pattern rather than or in addition to a Bayer pattern. The arrangement pattern of the CFA is described below with reference to FIGS. 3A through 3D.

The image processing apparatus 200 may reduce noise with respect to the image data IDT and perform image signal processing for image quality improvement, such as gamma correction, color filter array interpolation, color matrix, color correction, color enhancement, and the like. In addition, the image processing apparatus 200 may generate an image file by compressing image data generated by performing image signal processing for image quality improvement, or may restore the image data from the image file.

In an example embodiment, the signal processing unit 210 of the image processing apparatus 200 may perform an image processing operation including a remosaic processing operation or a demosaic processing operation on the image data IDT received from the image sensor 100. The signal processing unit 210 may perform the image processing operation, thereby converting a format of the image data IDT. The signal processing unit 210 may convert the image data IDT corresponding to a color filter pattern such as a Bayer pattern, a tetra pattern, or a hexadeca pattern into full color image data in an RGB format to generate the converted image data. In particular, the signal processing unit 210 may perform a sampling operation on the image data IDT according to the color filter pattern, such as a pattern (e.g., a tetra pattern or a hexadeca pattern) in addition to the Bayer pattern, and then perform a remosaic processing operation so that the remosaic processing operation may be more simplified. However, embodiments are not limited thereto, and the signal processing unit 210 may be included in the image sensor 100 rather than in the image processing apparatus 200. The image processing operation of the signal processing unit 210 is described below with reference to FIG. 4 or the like.

The image processing apparatus 200 may perform pre-processing, such as crosstalk correction, on the image data IDT in addition to an operation of converting the format of the image data IDT into full image data, and may further perform post-processing, such as a shafting operation, on the full image data. In addition, for example, the image processing apparatus 200 may further perform an operation, such as auto dark level compensation (ADLC), bad pixel correction, or lens shading correction, on the image data IDT.

Figure 2:
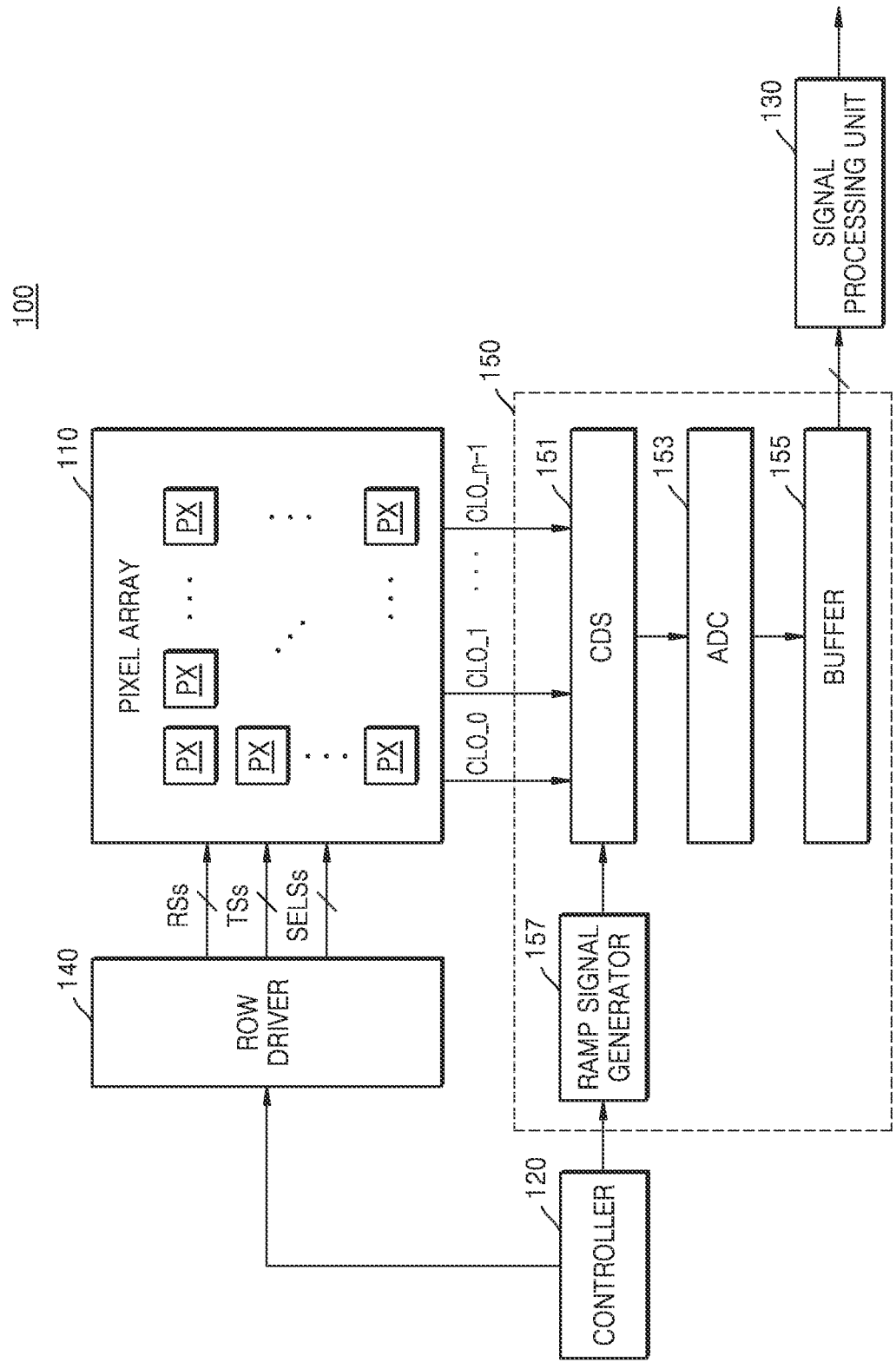
FIG. 2 is a block diagram illustrating the configuration of an image processor according to an example embodiment.

FIG. 2 is a block diagram illustrating the configuration of the image sensor 100 according to an example embodiment.

Referring to FIG. 2, the image sensor 100 may include a pixel array 110, a controller 120, a signal processing unit or signal processor 130, a row driver 140, and a signal reading unit 150. The signal reading unit 150 may include a correlated-double sampling circuit (CDS) 151, an analog-digital converter (ADC) 153, and a buffer 155.

The pixel array 110 may include a plurality of pixels PX that convert an optical signal into an electrical signal and are two-dimensionally arranged. The plurality of pixels PX may generate pixel signals according to the intensity of detected light. The pixels PX may be implemented by, for example, photoelectric conversion devices, such as charge-coupled devices (CCDs) or complementary metal oxide semiconductors (CMOSs), or various types of photoelectric conversion devices. The pixel array 110 may include a color filter to sense various colors, and each of the plurality of pixels PX may sense a corresponding color.

Each of the plurality of pixels PX may output a pixel signal to the CDS 151 through first through n-th column output lines CLO_0 through CLO_n-1. The CDS 151 may sample and hold the pixel signal provided by the pixel array 110. The CDS 151 may double-sample a specific noise level and a level according to the pixel signal, and may output a level corresponding to a difference therebetween. In addition, the CDS 151 may receive ramp signal generated by a ramp signal generator 157, compare the ramp signal with the pixel signal, and output a result of comparison.

The ADC 153 may convert an analog signal corresponding to the level received from the CDS 151 into a digital signal. The buffer 155 may latch the digital signal, and the latched digital signal may be sequentially output as image data to the signal processing unit 130 or the outside of the image sensor 100.

The controller 120 may control the pixel array 110 to absorb light and accumulate electric charges, to temporarily store the accumulated electric charges, and to output an electrical signal according to the stored electric charges to the outside of the pixel array 110. In addition, the controller 120 may control the signal reading unit 150 to measure the level of the pixel signal provided by the pixel array 110.

The row driver 140 may generate reset control signals RSs, transmission control signals TSs, and selection signals SELSs for controlling the pixel array 110 and may provide the signals RSs, TSs, and SELSs to the plurality of pixels PX. The row driver 140 may determine activation and deactivation timings of the reset control signals RSs, the transmission control signals TSs, and the selection signals SELSs provided to the pixels PX.

The signal processing unit 130 may perform signal processing based on the pixel signals output from the plurality of pixels PX. For example, the signal processing unit 130 may perform noise reduction processing, gain adjustment, waveform shaping processing, interpolation processing, white balance processing, gamma processing, edge enhancement processing, and the like.

In an example embodiment, the signal processing unit 130 may perform an image processing operation including a remosaic processing operation or a demosaic processing operation on image data received from the signal reading unit 150. The signal processing unit 130 may perform the image processing operation to convert the format of the image data and to output the converted format of the image data to the outside of the image sensor 100. For example, the signal processing unit 130 may convert image data corresponding to a color filter pattern such as a Bayer pattern, a tetra pattern, or a hexadeca pattern, into full color image data in the RGB format to generate the converted image data. In particular, the signal processing unit 130 may perform a sampling operation on the image data according to a color filter pattern such as a pattern (e.g., a tetra pattern, a hexadeca pattern, or the like) different from the Bayer pattern and then perform the remosaic processing operation, thereby simplifying the remosaic processing operation.

However, embodiments are not limited thereto, and the signal processing unit 130 may also be provided in a processor (e.g., 200 of FIG. 1) outside the image sensor 100. The image processing operation of the signal processing unit 130 is described with reference to FIG. 4.

FIGS. 3A through 3D are views illustrating a pixel array of an image sensor according to an example embodiment, which illustrate an example of a portion of the pixel array 110 of FIG. 2.

Figure 3A:
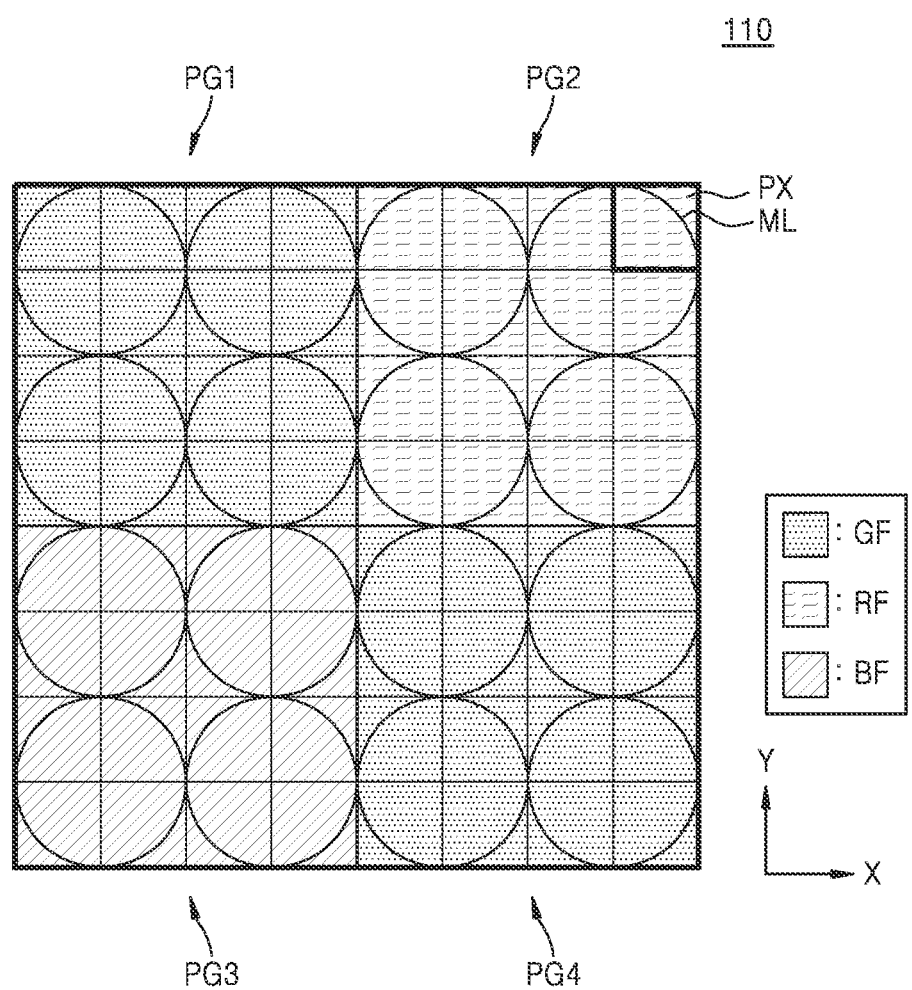
FIGS. 3A, 3B, 3C, and 3D are views illustrating a pixel array of an image sensor according to an example embodiment.

Referring to FIG. 3A, the pixel array 110 may include a plurality of pixel groups, for example, a first pixel group PG1, a second pixel group PG2, a third pixel group PG3, and a fourth pixel group PG4. The first pixel group PG1 and the second pixel group PG2 may be arranged in parallel in a first direction X, and the third pixel group PG3 and the fourth pixel group PG4 may be arranged in parallel in the first direction X. The first pixel group PG1 and the third pixel group PG3 may be arranged in parallel in a second direction Y perpendicular to the first direction X, and the second pixel group PG2 and the fourth pixel group PG4 may be arranged in parallel in the second direction Y.

Each of the first through fourth pixel groups PG1 through PG4 may include 16 pixels PX arranged in four adjacent rows and four adjacent columns in a 4×4 pattern. In an example embodiment, one micro lens ML may be arranged on four pixels PX. By the shape and the refractive index of the micro lens ML, pixel signals generated by each of four pixels PX in which one micro lens ML is arranged, may vary. For example, the phase of each of the pixel signals generated by four pixels PX may vary. Thus, an image processing apparatus (e.g., 200 of FIG. 1) according to an example embodiment may perform an auto focusing (AF) function by using the pixel signals.

The pixel array 110 may include a color filter so as to sense various colors. In an example embodiment, each of the first through fourth color groups PG1 through PG4 may include a corresponding color filter among a green color filter GF, a red color filter RF, and a blue color filter BF.

Each of the first through fourth pixel groups PG1 through PG4 may include a color filter so as to correspond to the Bayer pattern. For example, the first pixel group PG1 and the fourth pixel group PG4 may include the green color filter GF, the second pixel group PG2 may include the red color filter RF, and the third pixel group PG3 may include the blue color filter BF. However, embodiments are not limited thereto, and each of the first through fourth pixels PG1 through PG4 may include at least one of a white color filter, a yellow color filter, a cyan color filter, and a magenta color filter.

Figure 3B:
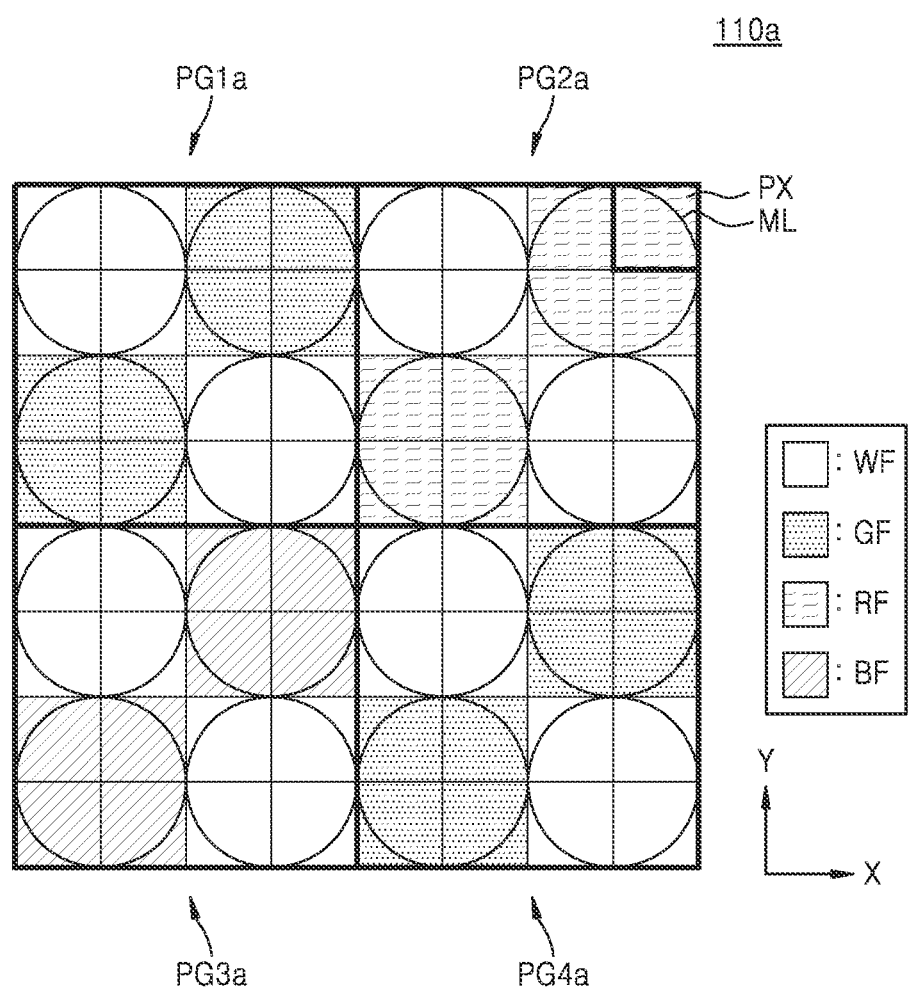

Referring to FIG. 3B, a pixel array 110a may include a first pixel group PG1a, a second pixel group PG2a, a third pixel group PG3a, and a fourth pixel group PG4a each including 16 pixels PX arranged in a 4×4 pattern.

Each of the first through fourth pixel groups PG1a through PG4a may include a white color filter WF and may include one of the green color filter GF, the red color filter RF, and the blue color filter BF. The white color filter WF may be a color filter through which all of red color light, blue color light, and green color light may pass.

For example, the first pixel group PG1 and the fourth pixel group PG4 may include the white color filter WF and the green color filter GF, the second pixel group PG2 may include the white color filter WF and the red color filter RF, and the third pixel group PG3 may include the white color filter WF and the blue color filter BF. However, embodiments are not limited to the illustration of FIG. 3B, and each of the first through fourth pixel groups PG1a through PG4a may include a yellow color filter instead of the white color filter WF. For example, the yellow color filter may be arranged in a position where the white color filter WF is disposed in FIG. 3B.

Figure 3C:
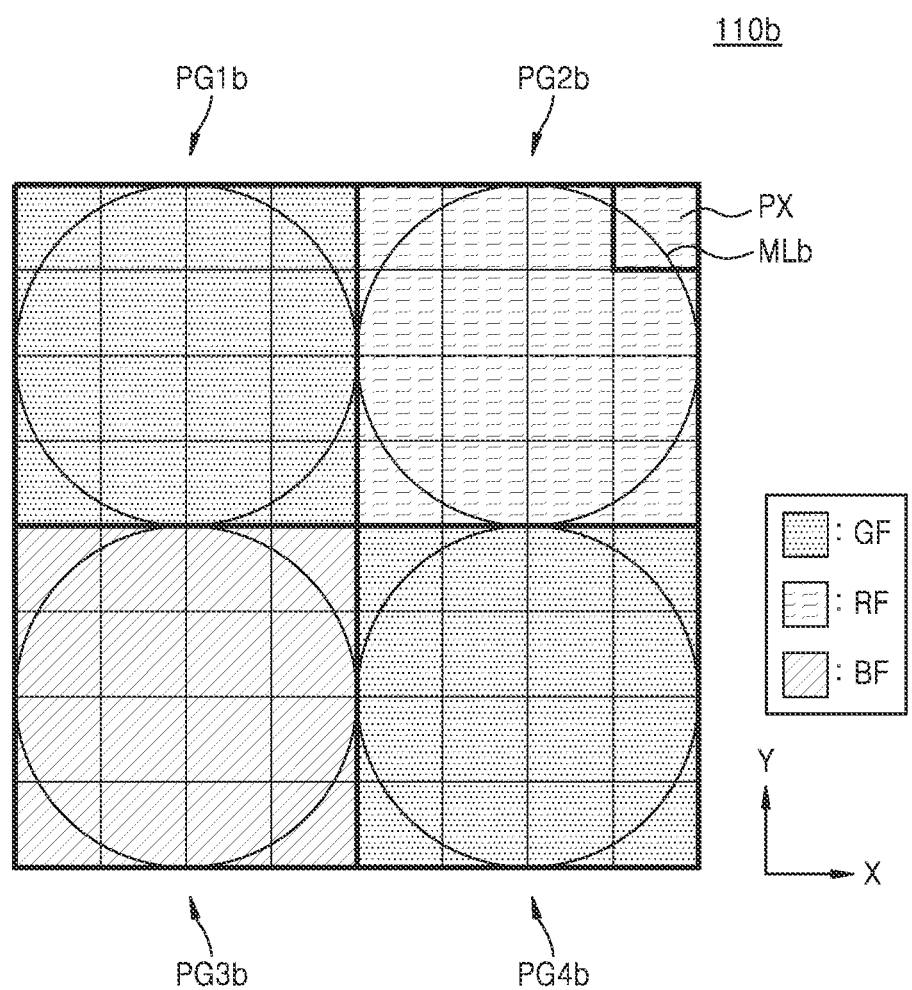

Referring to FIG. 3C, a pixel array 110b may include a first pixel group PG1b, a second pixel group PG2b, a third pixel group PG3b, and a fourth pixel group PG4b each including 16 pixels PX arranged in a 4×4 pattern. In an example embodiment, one micro lens MLb may be arranged on each of the first through fourth pixel groups PG1b through PG4b. By the shape and the refractive index of the micro lens MLb, pixel signals generated by each of 16 pixels PX included in one pixel group may vary, and the phase of each of the pixel signals generated by 16 pixels PX may vary. The image processing system 10 according to an example embodiment may perform an AF function by using the pixel signals. In the pixel arrays 110, 110a, and 110b of FIGS. 3A through 3C, 16 pixels may form one pixel group, and each of the pixel groups includes a corresponding color filter. Thus, the pixel arrays 110, 110a, and 110b of FIGS. 3A through 3C may be referred to as including a color filter array having a hexadeca pattern. An image sensor including the pixel arrays 110, 110a, and 110b of FIGS. 3A through 3C may generate image data corresponding to the color filter array having a hexadeca pattern.

Figure 3D:
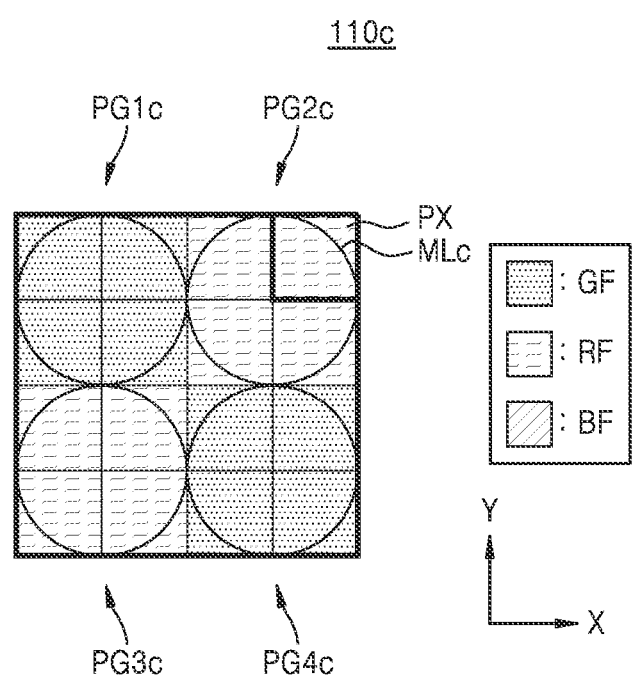

Referring to FIG. 3D, a pixel array 110c may include a first pixel group PG1c, a second pixel group PG2c, a third pixel group PG3c, and a fourth pixel group PG4c each including four pixels PX arranged in a 2×2 pattern in two rows and two columns. In an example embodiment, one micro lens MLc may be arranged in each of the first through fourth pixel groups PG1c through PG4c. By the shape and the refractive index of the micro lens MLc, pixel signals in each of four pixels PX included in one pixel group may vary, and the phase of each of the pixel signals may vary. The image processing system 10 according to an example embodiment may perform an AF function by using the pixel signals.

Each of the first through fourth pixel groups PG1c through PG4c may include a color filter to correspond to a Bayer pattern. For example, the first pixel group PG1c and the fourth pixel group PG4c may include the green color filter GF, the second pixel group PG2c may include the red color filter RF, and the third pixel group PG3c may include the blue color filter BF. However, embodiments are not limited thereto, and each of the first through fourth pixel groups PG1c through PG4c may include at least one of a white color filter, a yellow color filter, a cyan color filter, and a magenta color filter.

In the pixel array 110c of FIG. 3D, four pixels PX form one pixel group, and each of the pixel groups includes a corresponding color filter. Thus, the pixel array 110c of FIG. 3D may be referred to as including a color filter array having a tetra pattern. The image sensor including the pixel array 110c of FIG. 3D may generate image data corresponding to the color filter array having a tetra pattern.

Figure 4:
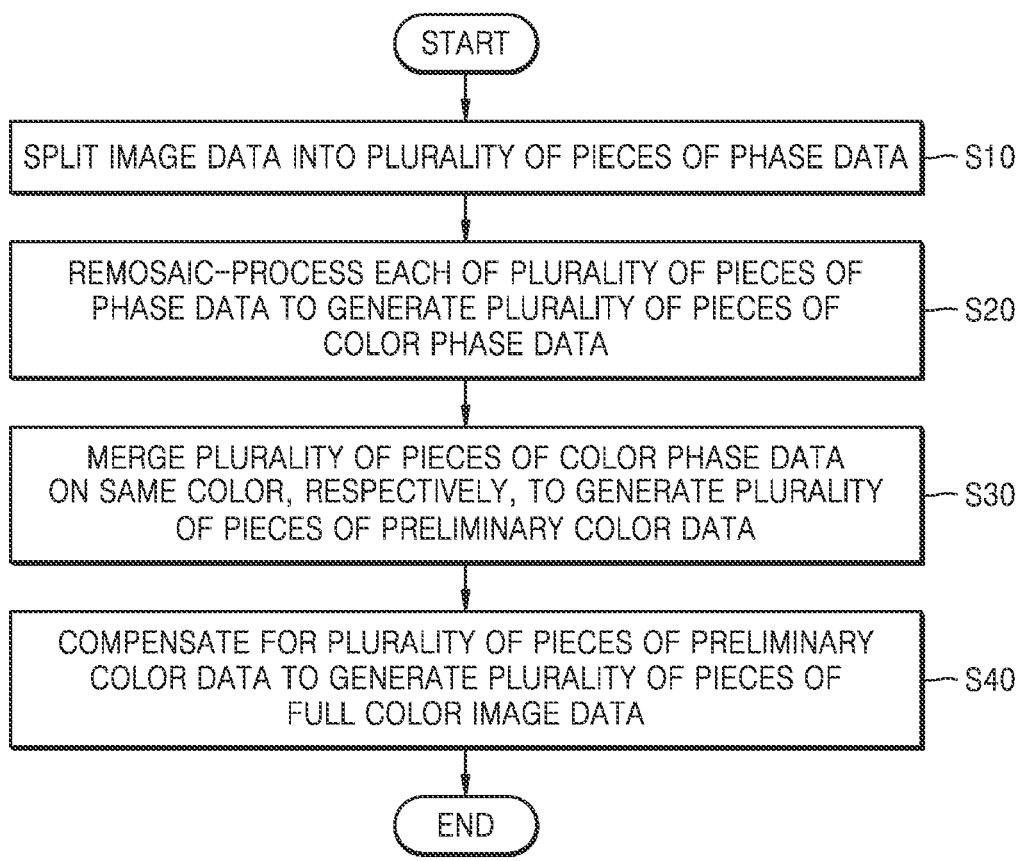
FIGS. 4 and 5 are block diagrams illustrating an image processing method according to an example embodiment.
Figure 5:
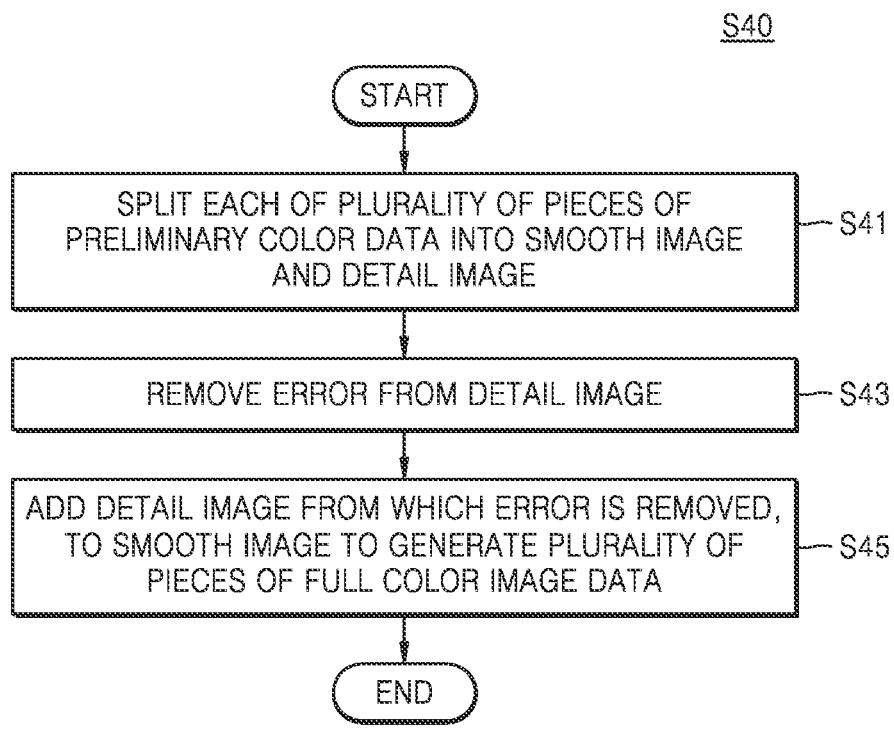

FIGS. 4 and 5 are block diagrams illustrating an image processing method according to an example embodiment. Operations to be described below may be performed by the signal processing unit 210 of the image processing apparatus 200 of FIG. 1 or the signal processing unit 130 of the image sensor 100 of FIG. 2. Operations S10 through S40 may be operations of generating image data in which various pieces of color information are included, for example, a plurality of pieces of full color image data according to each color. However, operation S40 may not be performed according to the example embodiment.

Referring to FIG. 4, in operation S10, image data may be split into a plurality of pieces of phase data. In an example embodiment, image data of a (2n)×(2n) matrix pattern may be sampled as a plurality of pieces of phase data of an (n)×(n) matrix pattern, respectively. For example, the image data generated by the pixel arrays 110, 110a, 110b, and 110c described with reference to FIGS. 3A through 3D may include the same color filter and may be generated by pixel signals having different phases. The image data may be sampled according to phases to be generated as a plurality of pieces of phase data each including information about different colors. However, the image processing method according to embodiments are not limited thereto, and in operation S10, in an example embodiment, image data of a (3n)×(3n) matrix pattern may be sampled as a plurality of pieces of phase data of an (n)×(n) matrix pattern, a sampling method may be variously modified, and a sampling operation may be performed considering a subsequent remosaic processing operation.

In operation S20, each of the plurality of pieces of phase data may be remosaic-processed to generate a plurality of pieces of color phase data. For example, a plurality of pieces of red color phase data including information about a red color and each including information about different phases, a plurality of pieces of green color phase data including information about a green color and each including information about different phases, and a plurality of pieces of blue color phase data including information about a blue color and each including information about different phases may be generated. In this case, the remosaic processing operation in operation S20 may include a general demosaic processing operation.

In operation S30, the plurality of pieces of color phase data corresponding to the same color may be respectively merged to generate a plurality of pieces of preliminary color data. For example, a plurality of pieces of red color phase data may be merged to generate red preliminary color data, and a plurality of pieces of green color phase data may be merged to generate green preliminary color data, and a plurality of pieces of blue color phase data may be merged to generate blue preliminary color data.

Referring to FIGS. 4 and 5, in operation S40, the plurality of pieces of preliminary color data may be compensated for to generate a plurality of pieces of full color image data. Operation S40 in FIG. 4 as an operation of removing noise generated by the plurality of pieces of preliminary color data may include operations S41 through S45 in FIG. 5. The sampling operation of splitting image data into a plurality of pieces of phase data (S10) may be performed so that noise (aliasing) may occur in the plurality of pieces of preliminary color data, and in operation S40, the above-described operation of removing noise may be performed.

Referring to FIG. 5, in operation S41, each of the plurality of pieces of preliminary color data may be split into a smooth image and a detail image, and in operation S43, an error may be removed from the split detail image. The smooth image may refer to a signal in a relatively low frequency band, and the detail image may refer to a signal in a relatively high frequency band. Signals having a repeated pattern among signals in a high frequency band may be removed from the detail image so that the error may be removed.

In operation S45, the detail image from which the error is removed, and the smooth image may be added to each other to generate a plurality of pieces of full color image data, respectively. In an example embodiment, the plurality of pieces of full color image data may include red color data, green color data, and blue color data, and each of the red color data, the green color data, and the blue color data may be data of a (2n)×(2n) matrix pattern. For example, the red preliminary color data may be split into a smooth image and a red detail image, and an error may be removed from the red detail image and then the red detail image from which the error is removed and the red smooth image may be added to each other to generate red color data. Blue color data and green color data may be formed in the same manner as a forming the red color data.

In the image processing method according to the example embodiment, an operation of splitting image data into a plurality of pieces of phase data may be firstly performed before the remosaic processing operation is performed, so that the remosaic processing operation may be relatively simplified. Thus, latency caused by the remosaic processing operation is reduced so that a time required for generating full color image data may be reduced.

Figure 6:
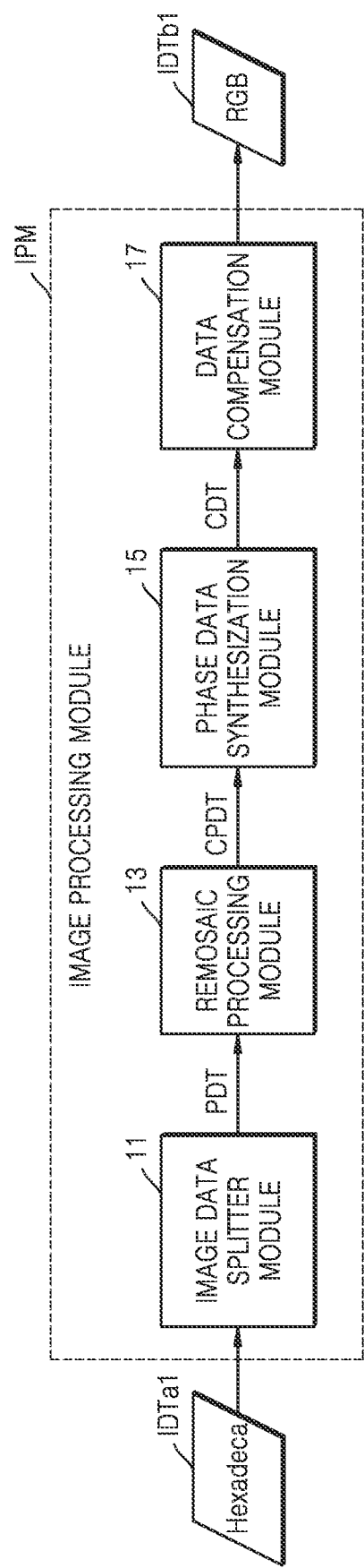
FIGS. 6 and 7 are block diagrams illustrating an image processing apparatus according to an example embodiment.
Figure 7:
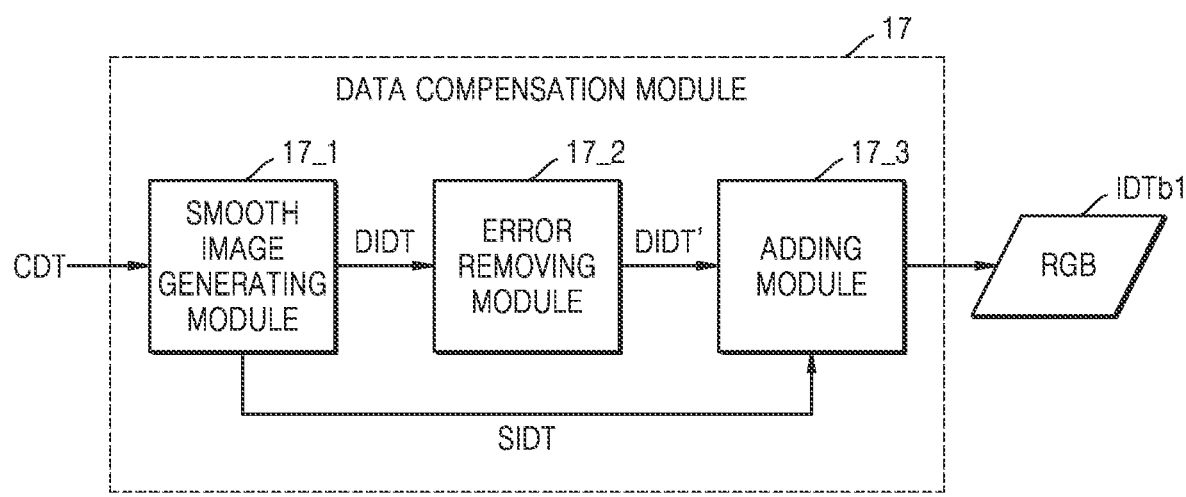

FIGS. 6 and 7 are block diagrams illustrating an image processing apparatus according to an example embodiment. FIGS. 8A through 8D are views of an operation of each of modules of FIG. 6. An image processing module (or image processor) IPM of FIG. 6 may be included in the signal processing unit (or signal processor) 210 of the image processing apparatus 200 of FIG. 1 and may also be included in the signal processing unit (or signal processor) 130 of the image sensor 100 of FIG. 2.

Referring to FIG. 6, the image processing module IPM may receive first image data IDTa1 and convert the received first image data IDTa1 into first full color image data IDTb1. The image processing module IPM may include an image data splitter module 11, a remosaic processing module 13, a phase data synthesization module 15, and a data compensation module 17. The configuration of the image processing module IPM and a module to be described below may be implemented by a software block that may be executed by a certain processor, or a combination of a dedicated hardware block and a processing unit including at least one processor.

The image data splitter module 11 may convert the first image data IDTa1 into a plurality of pieces of phase data PDT. In an example embodiment, the image data splitter module 11 may receive image data IDTa1 of a (2n)×(2n) matrix pattern to split the received image data IDTa1 into a plurality of pieces of phase data PDT of an (n)×(n) matrix pattern.

Figure 8A:
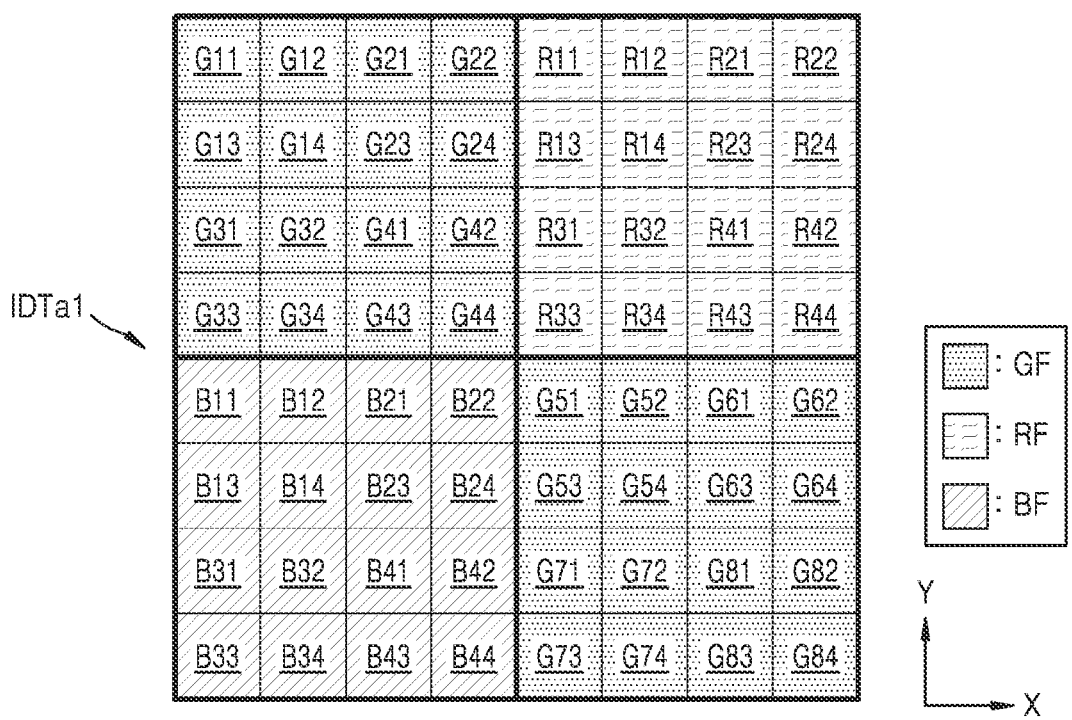
FIGS. 8A, 8B, 8C, and through 8D are views illustrating an operation of each of modules of FIG. 6.
Figure 8B:
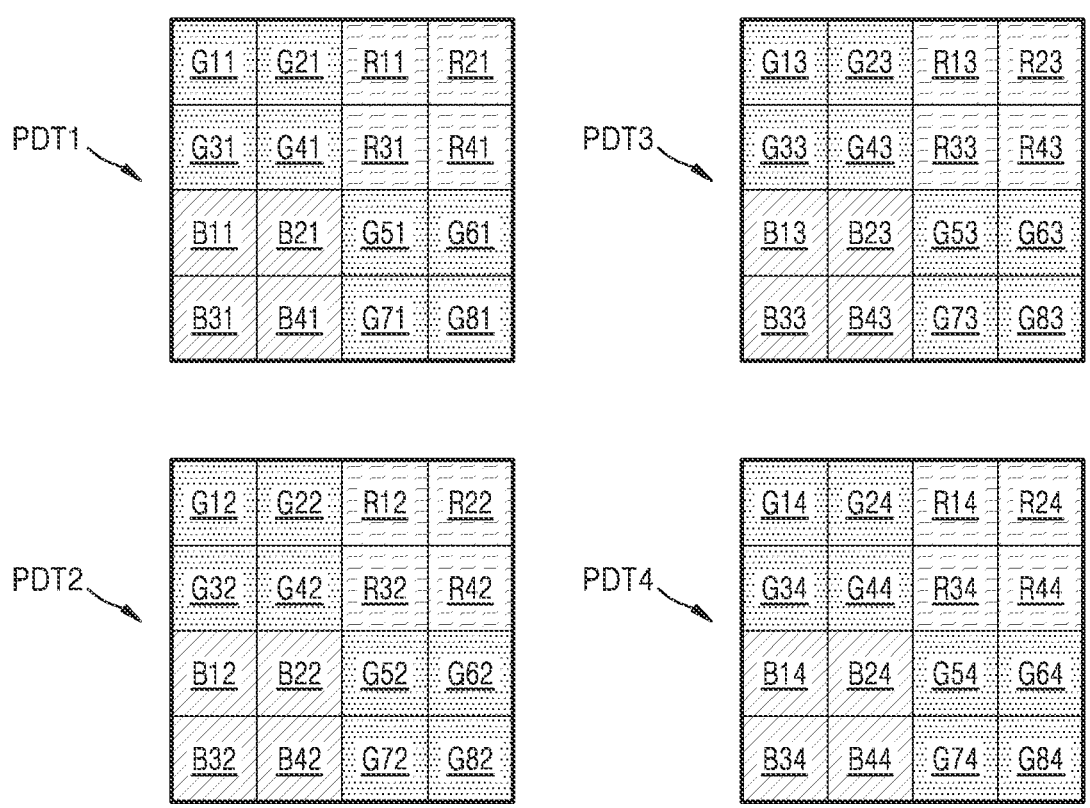

Referring to FIGS. 6, 8A, and 8B, for example, the first image data IDTa1 may be image data generated by the pixel array 110 described with reference to FIG. 3A in a first operation mode. For example, the first image data IDTa1 may be hexadeca image data in which one pixel group includes 16 pixels arranged in a 4×4 pattern and each pixel group includes a corresponding color filter among the red color filter RF, the green color filter GF and the blue color filter BF and which is generated by a pixel array including a color filter array of a hexadeca pattern. The first image data IDTa1 may include pixel values G11~G14, G21~G24, G31~G34, and G41~G44 of a green pixel arranged in a 4×4 pattern, pixel values R11~R14, R21~R24, R31~R34, and R41~R44 of a red pixel arranged in a 4×4 pattern, pixel values B11~B14, B21~B24, B31~B34, and B41~B44 of a blue pixel arranged in a 4×4 pattern, and pixel values G51~G54, G61~G64, G71~G74, and G81~G84 of a green pixel arranged in a 4×4 pattern.

In this case, the plurality of pieces of phase data PDT may include a first phase data PDT1, a second phase data PDT2, a third phase data PDT3, and a fourth phase data PDT4. For example, each of the first through fourth phase data PDT1 through PDT4 may be generated by sampling pixel values of pixels selected by a specific method. The specific method may include an operation selecting a pixel in the first image data IDTa1, skipping pixels adjacent to the pixel selected in a row direction (X-axis direction) and a column direction (Y-axis direction) and selecting next pixels adjacent to the pixels skipped. Each of the first through fourth phase data PDT1 through PDT4 may have a size of ¼ of the first image data IDTa1.

For example, the first phase data PDT1 may include first green pixel values G11, G21, G31, G41, G51, G61, G71, and G81, first red pixel values R11, R21, R31, and R41, and first blue pixel values B11, B21, B31, and B41, and the second phase data PDT2 may include second green pixel values G12, G22, G32, G42, G52, G62, G72, and G82, second red pixel values R12, R22, R32, and R42, and second blue pixel values B12, B22, B32, and B42. In addition, for example, the third phase data PDT3 may include third green pixel values G13, G23, G33, G43, G53, G63, G73, and G83, third red pixel values R13, R23, R33, and R43, and third blue pixel values B13, B23, B33, and B43, and the fourth phase data PDT4 may include fourth green pixel values G14, G24, G34, G44, G54, G64, G74, and G84, fourth red pixel values R14, R24, R34, and R44, and fourth blue pixel values B14, B24, B34, and B44.

Figure 8C:
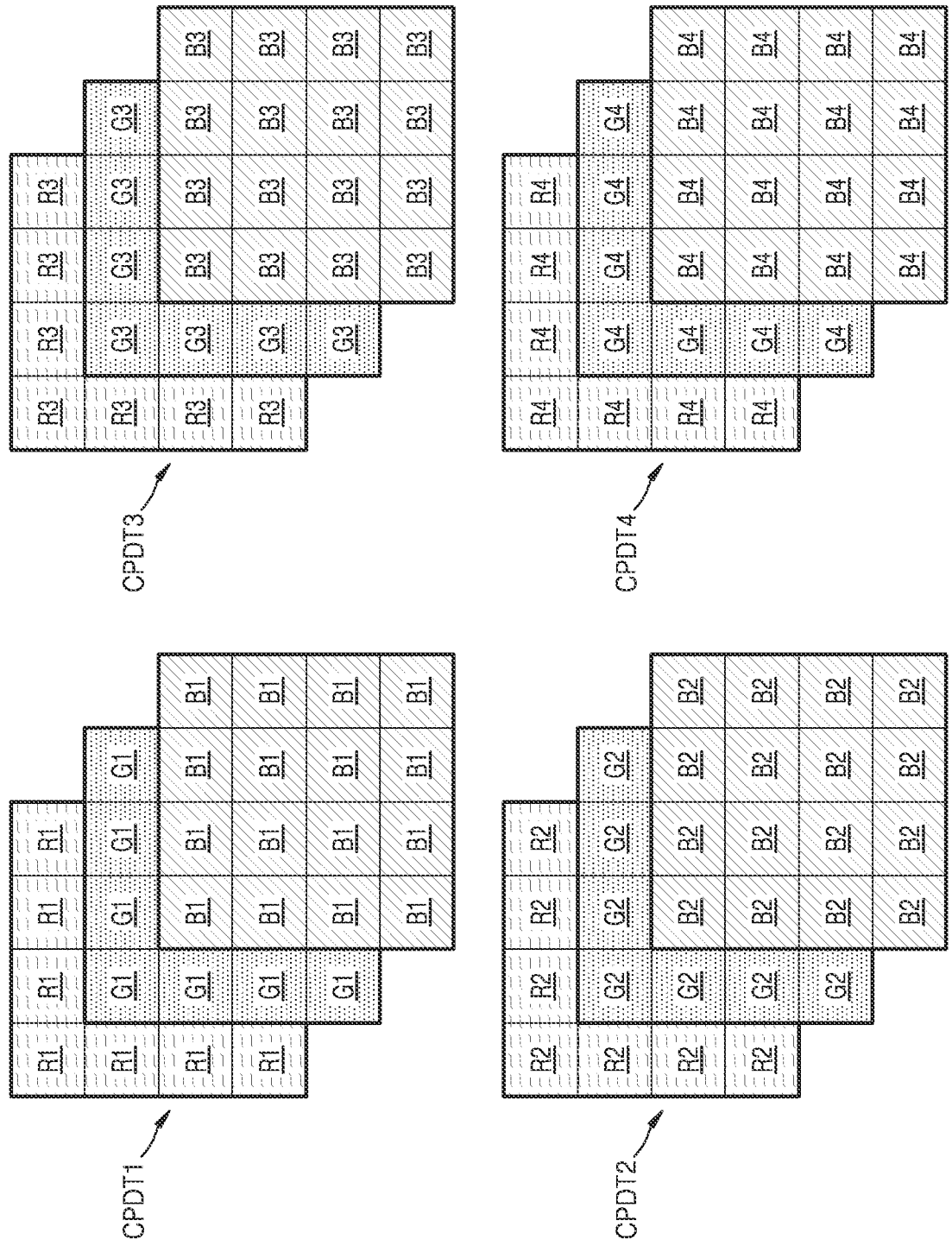

Referring to FIGS. 6, 8B, and 8C, the remosaic processing module 13 may receive a plurality of pieces of phase data PDT to generate a plurality of pieces of color phase data CPDT. For example, the remosaic processing module 13 may perform remosaic processing on the first through fourth phase data PDT1 through PDT4, respectively, thereby generating a plurality of pieces of first color phase data CPDT1, second color phase data CPDT2, third color phase data CPDT3, and fourth color phase data CPDT4.

Each of the first through fourth phase data PDT1 through PDT4 may have the same color pattern as image data generated according to a color filter arrangement of the tetra pattern. Thus, the remosaic processing module 13 may perform remosaic processing on the first through fourth phase data PDT1 through PDT4 in the same manner as a method of remosaic processing the tetra pattern to generate color data, and may generate each of a plurality of pieces of first through fourth color phase data CPDT1 through CPDT4.

For example, the first color phase data CPDT1 may include first red phase data including red pixel values R1 arranged in a 4×4 pattern, first green phase data including green pixel values G1 arranged in a 4×4 pattern, and first blue phase data including blue pixel values B1 arranged in a 4×4 pattern. In addition, for example, the second color phase data CPDT2 may include second red phase data, second green phase data, and second blue phase data each including red pixel values R2, green pixel values G2, and blue pixel values B2 respectively arranged in a 4×4 pattern, and the third color phase data CPDT3 may include third red phase data, third green phase data, and third blue phase data each including red pixel values R3, green pixel values G3, and blue pixel values B3 respectively arranged in a 4×4 pattern, and the fourth color phase data CPDT4 may include fourth red phase data, fourth green phase data, and fourth blue phase data each including red pixel values R4, green pixel values G4, and blue pixel values B4 respectively arranged in a 4×4 pattern.

Figure 8D:
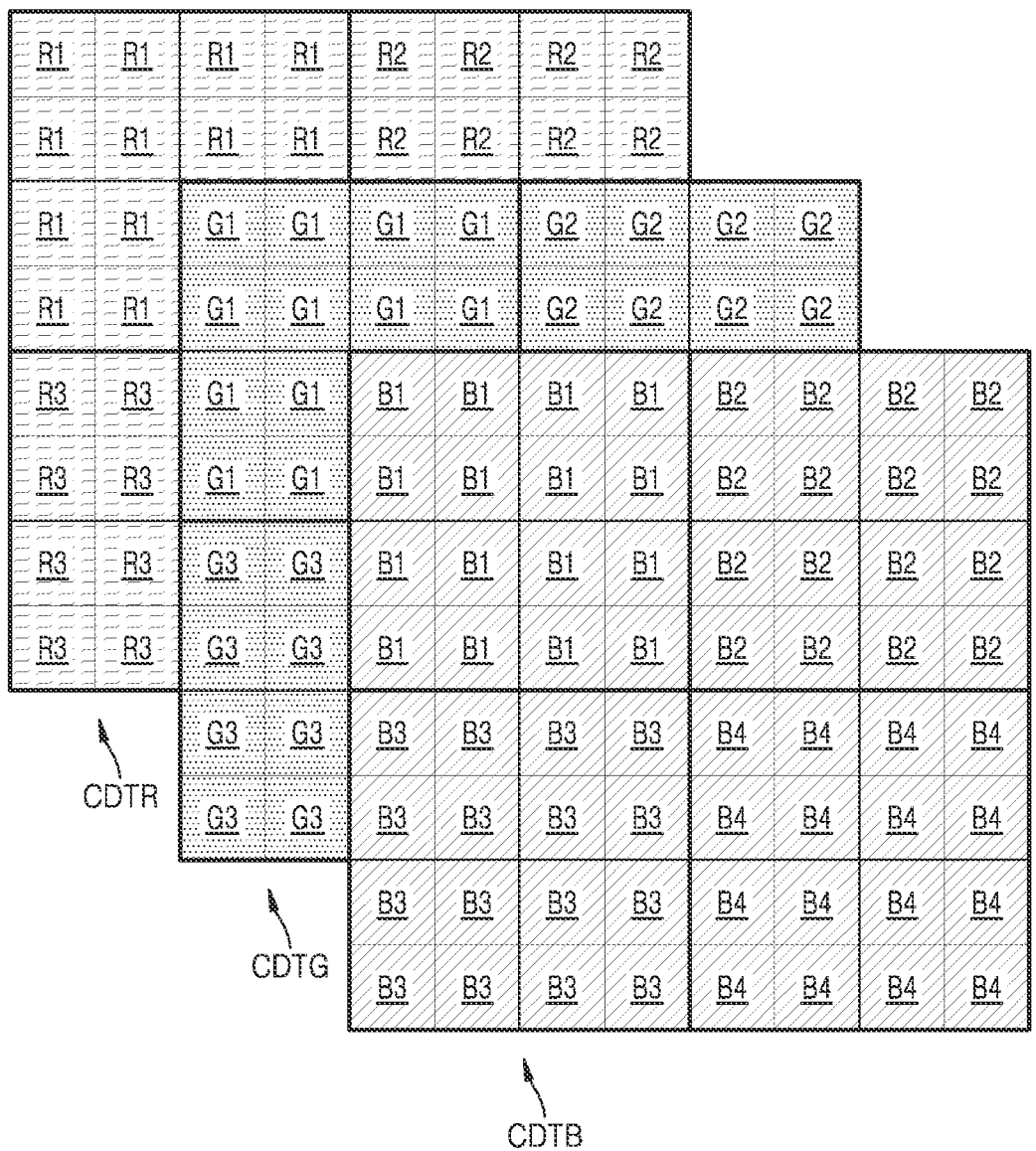

Referring to FIGS. 6, 8C, and 8D, the phase data synthesization module 15 may respectively merge the plurality of pieces of color phase data CPDT corresponding to the same color to generate a plurality of pieces of preliminary color data CDT. The plurality of pieces of preliminary color data CDT may include preliminary red color data CDTR, preliminary green color data CDTG, and preliminary blue color data CDTB. For example, the phase data synthesization module 15 may merge first through fourth red phase data among the plurality of pieces of first through fourth color phase data CPDT1 through CPDT4 to generate preliminary red color data CDTR, merge the first through fourth green phase data to generate preliminary green color data CDTG, and merge first through fourth blue phase data to generate preliminary blue color data CDTB. Each of the preliminary red color data CDTR, the preliminary green color data CDTG, and the preliminary blue color data CDTB may be data of a (2n)×(2n) matrix pattern.

Referring to FIGS. 6 and 7, the data compensation module 17 may perform a compensation operation of receiving a plurality of pieces of preliminary color data CDT and removing an error from the plurality of pieces of preliminary color data CDT to generate a plurality of pieces of first full color image data IDTb1.

The data compensation module 17 may include a smooth image generating module 17_1, an error removing module 17_2, and an adding module 17_3. The smooth image generating module 17_1 may extract smooth images SIDT from each of the plurality of pieces of preliminary color data CDT and generate detail images DIDT by removing the smooth images SIDT from the plurality of pieces of preliminary color data CDT. The smooth image generating module 17_1 may split each of the preliminary red color data CDTR, the preliminary green color data CDTG, and the preliminary blue color data CDTB into a smooth image and a detail image. The smooth images SIDT may refer to signals in a relatively low frequency band, and the detail images DIDT may refer to signals in a relatively high frequency band.

The error removing module 17_2 may receive a plurality of pieces of detail images DIDT to remove an error from the plurality of detail images DIDT or to output the plurality of detail images DIDT from which the error is removed. The error removing module 17_2 may remove signals having repeated patterns among signals in a high frequency band from the detail images DIDT, thereby removing an error.

The adding module 17_3 may receive the smooth images SIDT and the detail images DIDT from which the error is removed, and add them together, thereby generating a plurality of pieces of first full color image data IDTb1. The plurality of pieces of first full color image data IDTb1 may include red image data of red color, green image data of green color, and blue image data of blue color.

In the image processing apparatus according to the example embodiment, an operation of splitting the first image data IDTa1 into a plurality of pieces of phase data PDT may be first performed before the remosaic processing operation is performed, and each of the plurality of pieces of phase data PDT may be remosaic-processed so that a remosaic processing operation may be relatively simplified. For example, even though an additional remosaic processing module for remosaic-processing first image data IDTa1 of a (2n)×(2n) matrix pattern is not provided, the remosaic processing module 13 for performing a remosaic processing operation on data of an (n)×(n) matrix pattern may be used so that the configuration of the image processing module IPM may be simplified and an operating latency of the image processing module IPM may be reduced.

As described above, an operation of converting the first image data IDTa1 shown in FIG. 8A into a plurality of pieces of first full color image data IDTb1 has been described, however, this is an example. Operations of modules described as above may also be used to convert image data that is generated by the pixel arrays described with reference to FIGS. 3B through 3D and have different color patterns from that of the first image data IDTa1 into full color image data. For example, the image data generated by the pixel array 110a described with reference to FIG. 3B may be converted into red image data, green image data, and blue image data by the image processing module IPM. According to another example embodiment, for example, the image data generated by the pixel array 110a may also be converted into red image data, green image data, blue image data, and white image data by the image processing module IPM.

Figure 9:
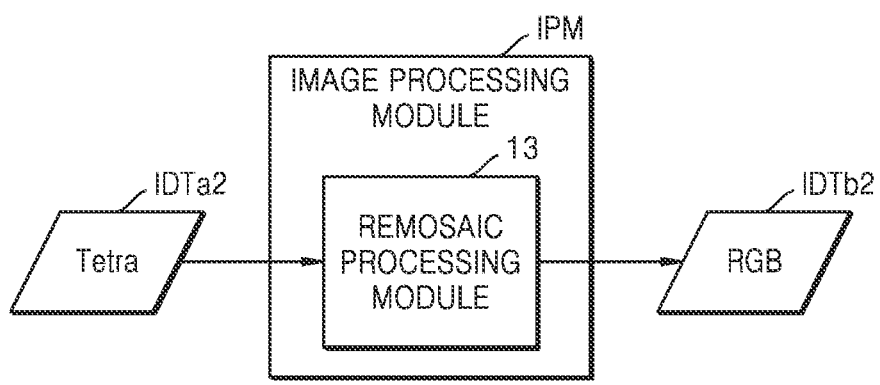
FIG. 9 is a block diagram illustrating an image processing apparatus according to an example embodiment.
Figure 10:
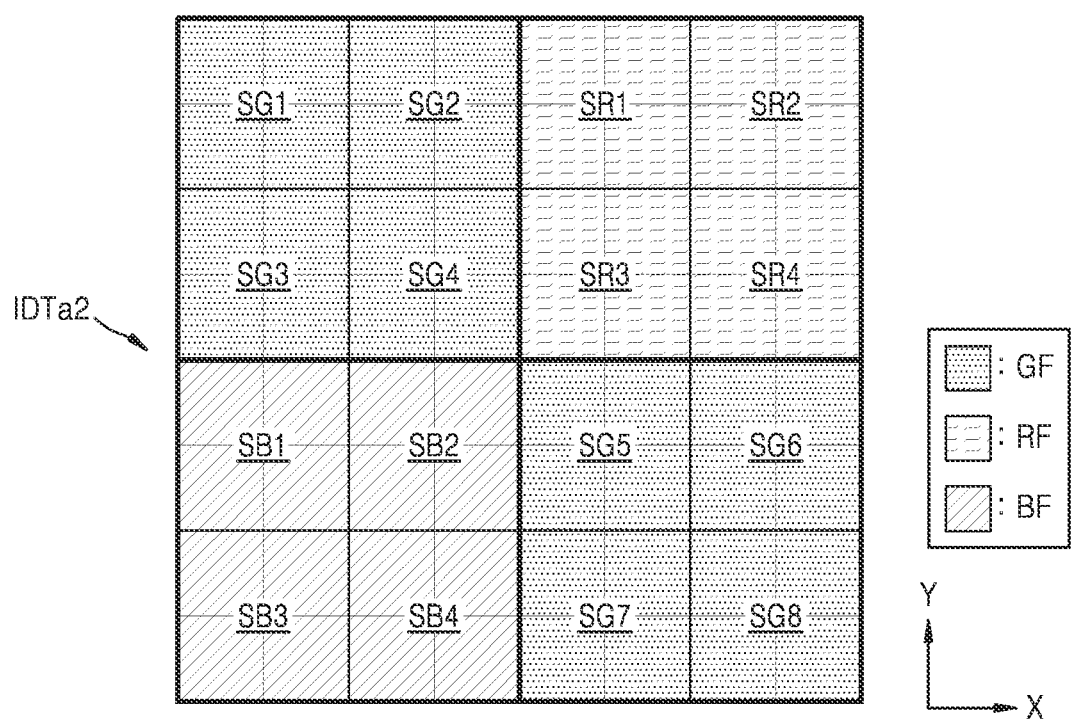
FIG. 10 illustrates an operation of an image processing module of FIG. 9.

FIG. 9 is a block diagram of an image processing apparatus according to an example embodiment. FIG. 10 is a view illustrating an operation of the image processing module of FIG. 9. The image processing module IPM of FIG. 9 may also be included in the signal processing unit 210 of the image processing apparatus 200 of FIG. 1 or may also be included in the signal processing unit 130 of the image sensor 100 of FIG. 2.

Referring to FIGS. 9 and 10, the image processing module IPM may receive second image data IDTa2 to convert the received second image data IDTa2 into second full color image data IDTb2. For example, the second image data IDTa2 may be image data generated by the pixel array 110 described with reference to FIG. 3A in a second operation mode. For example, the second image data IDTa2 may be tetra image data of a tetra pattern in which four pixels arranged in a 2×2 pattern are simultaneously operated as one shared pixel. The second image data IDTa2 may include pixel values SG1 through SG4 of green shared pixels arranged in a 2×2 pattern, pixel values SR1 through SR4 of red shared pixels arranged in a 2×2 pattern, pixel values SB1 through SB4 of blue shared pixels arranged in a 2×2 pattern, and pixel values SG5 through SG8 of green shared pixels arranged in a 2×2 pattern. However, an example of the second image data IDTa2 described with reference to FIG. 10 is an example, and an operation of a module to be described below may also be used to convert image data having a different color pattern, as described with reference to FIGS. 3B through 3D, into full color image data.

The image processing module IPM may include a remosaic processing module 13. The configuration of the remosaic processing module 13 may be implemented by a software block executed by a certain processor or a combination of a dedicated hardware block and a processing unit. In an example embodiment, the remosaic processing module 13 may have the same configuration as the remosaic processing module 13 described with reference to FIG. 6. The remosaic processing module 13 may receive the second image data IDTa2 and remosaic-process the second image data IDTa2, thereby generating second full color image data IDTb2. Thus, even when the first image data IDTa1 of FIG. 8 is generated or the second image data IDTa2 of FIG. 10 is generated according to an operation mode of the image processing apparatus, the first image data IDTa1 of FIG. 8A and the second image data IDTa2 of FIG. 10 is remosaic-processed by the same remosaic processing module 13, so that the image processing module may be more simply implemented. In addition, the area of the image processing module IPM in the image processing apparatus may be reduced.

Figure 11:
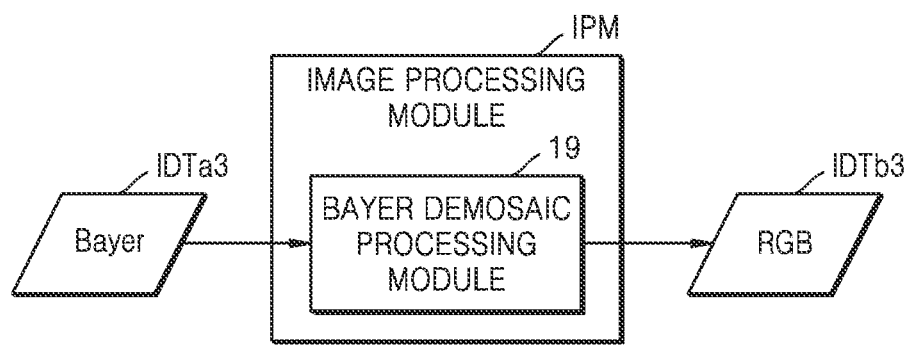
FIG. 11 is a block diagram illustrating an image processing apparatus according to an example embodiment.
Figure 12:
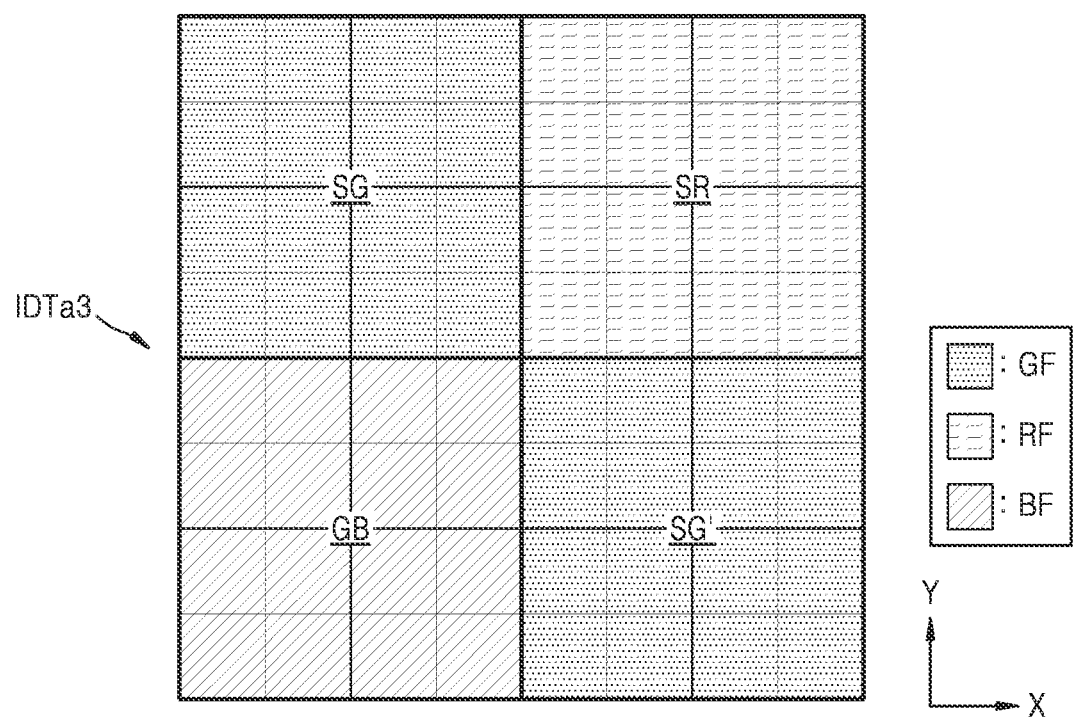
FIG. 12 is a view illustrating an operation of an image processing module of FIG. 11.

FIG. 11 is a block diagram of an image processing apparatus according to an example embodiment. FIG. 12 is a view illustrating an operation of an image processing module of FIG. 11. The image processing module IPM of FIG. 11 may also be included in the signal processing unit 210 of the image processing apparatus 200 of FIG. 1 or may also be included in the signal processing unit 130 of the image sensor 100 of FIG. 2.

Referring to FIGS. 11 and 12, the image processing module IPM may receive third image data IDTa3 and convert the received third image data IDTa3 into third full color image data IDTb3. For example, the third image data IDTa3 may be image data generated by the pixel array 110 described with reference to FIG. 3A in a third operation mode. For example, the third image data IDTa3 may be Bayer image data of a Bayer pattern in which 16 pixels arranged in a 4×4 pattern are simultaneously operated as one shared pixel. The third image data IDTa3 may include a pixel value SG of a green shared pixel, a pixel value SR of a red shared pixel, a pixel value SB of a blue shared pixel, and a pixel value SG' of a green shared pixel, arranged in a Bayer pattern. However, an example of the third image data IDTa3 described with reference to FIG. 12 is an example, and an operation of a module to be described below may also be used to convert image data having a different color pattern, as described with reference to FIGS. 3B through 3D, into full color image data.

The image processing module IPM may further include a Bayer demosaic processing module 19. The configuration of the Bayer demosaic processing module 19 may be implemented by a software block executed by a certain processor or a combination of a dedicated hardware block and a processing unit. The Bayer demosaic processing module 19 may receive the third image data IDTa3 and demosaic-process the third image data IDTa3, thereby generating third full color image data IDTb3.

In an image sensor according to the example embodiment, the first image data IDTa1 of FIG. 8A that is data of a (2n)×(2n) matrix pattern may be generated by the first operation mode, the second image data IDTa2 of FIG. 10 that is data of an (n)×(n) matrix pattern may be generated by the second operation mode, and the third image data IDTa3 of FIG. 12 that is data of a (n/2)×(n/2) matrix pattern may be generated by the third operation mode. The image processing module IPM may receive first image data IDTa1, second image data IDTa2, and third image data IDTa3 according to an operation mode and may convert the received first, second, and third image data IDTa1, IDTa2, and IDTa3 into full color image data IDTb1, IDTb2, and IDTb3.

Figure 13:
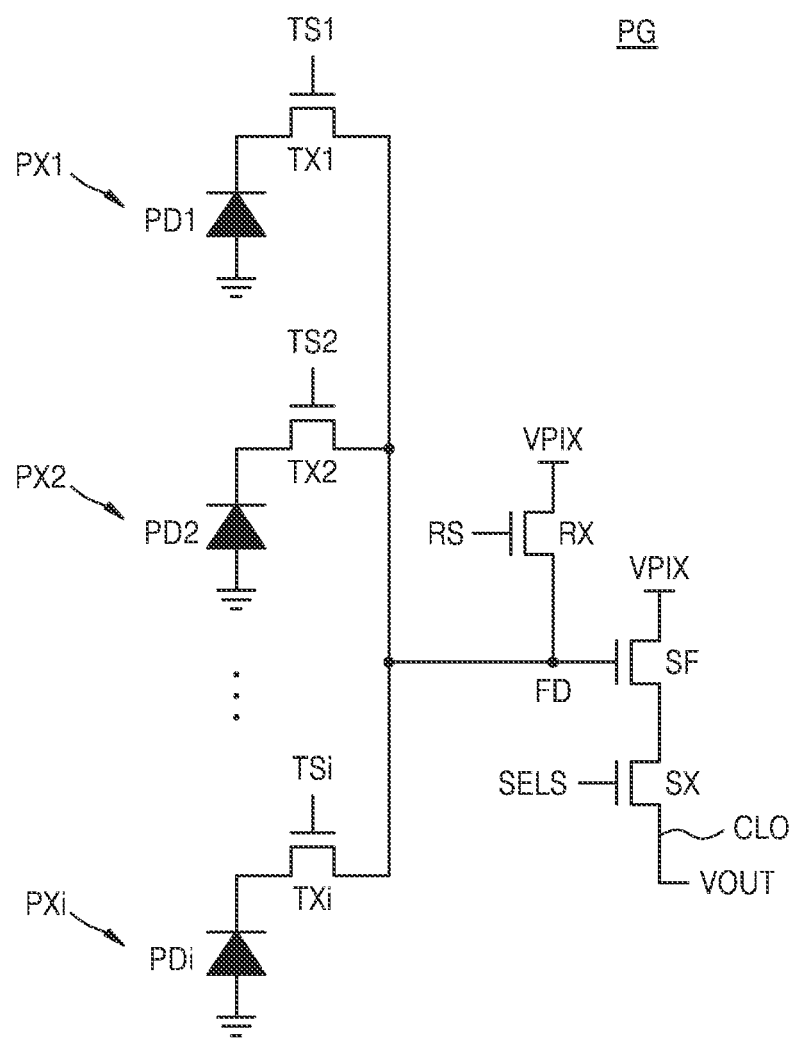
FIG. 13 is an example circuit diagram of a pixel group of FIGS. 3A through 3D.

FIG. 13 is an example circuit diagram of a pixel group of FIGS. 3A through 3D. In FIG. 13, an example embodiment in which pixels included in one pixel group share a floating diffusion region, will be described, but the image sensor according to embodiments are not limited thereto. Some pixels included in the pixel group may share the floating diffusion region, and pixels included in different pixel groups may share different floating diffusion regions.

Referring to FIG. 13, the pixel group PG may include first through i-th pixels PX1 through PXi, where i is a natural number. For example, as described with reference to FIGS. 3A through 3C, the pixel group PG may include 16 pixels arranged in a 4×4 pattern, and alternatively, as described with reference to FIG. 3D, the pixel group PG may include four pixels arranged in a 2×2 pattern or may also include nine pixels arranged in a 3×3 pattern.

The first pixel PX1 may include a first photodiode PD1 and a first transmission transistor TX1, the second pixel PX2 may include a second photodiode PD2 and a second transmission transistor TX2, and the i-th pixel PXi may include an i-th photodiode PDi and an i-th transmission transistor TXi.

Each of the first photodiode PD1, the second photodiode PD2, and the i-th photodiode PDi may generate photocharges varying according to the intensity of light. For example, each of the first photodiode PD1, the second photodiode PD2, and the i-th photodiode PDi may be a P-N junction diode and may generate electric charges, i.e., electrons that are negative electric charges and holes that are positive electric charges in proportion to the amount of incident light. Each of the first photodiode PD1, the second photodiode PD2, and the i-th photodiode PDi may be at least one of a phototransistor, a photogate, and a pinned photo diode (PPD) that are examples of photoelectric conversion devices and a combination thereof.

Each of the first transmission transistor TX1, the second transmission transistor TX2, and the i-th transmission transistor TXi may transmit photocharges generated by each of the first photodiode PD1, the second photodiode PD2, and the i-th photodiode PDi to the floating diffusion region FD in response to a first transmission control signal TS1, a second transmission control signal TS2, and an i-th transmission control signal TSi. When each of the first transmission transistor TX1, the second transmission transistor TX2 and the i-th transmission transistor TXi is turned on, photocharges generated by each of the first photodiode PD1, the second photodiode PD2, and the i-th photodiode PDi may be accumulated on and stored in the floating diffusion region FD.

The pixel group PG may include a select transistor SX, a source follower SF, and a reset transistor RX. However, unlike the illustration of FIG. 13, at least one of the select transistor SX, the source follower SF, and the reset transistor RX may be omitted.

In an example embodiment, first through i-th pixels PX1 through PXi included in the same pixel group PG may share the floating diffusion region FD, may share the select transistor SX, the source follower SF, and the reset transistor RX and may output a pixel signal VOUT to the same column output line CLO. In this case, the column output line CLO may be, for example, one column output line among first through n-th column output lines CLO_0 through CLO_n-1 of FIG. 2.

The reset transistor RX may periodically reset the electric charges accumulated in the floating diffusion region FD. The source electrode of the reset transistor RX may be connected to the floating diffusion region FD, and the drain electrode of the reset transistor RX may be connected to a power supply voltage VPIX. When the reset transistor RX is turned on according to the reset control signal RS, the power supply voltage VPIX connected to the drain electrode of the reset transistor RX may be transmitted to the floating diffusion region FD. When the reset transistor RX is turned on, the electric charges accumulated in the floating diffusion region FD may be discharged to reset floating diffusion region FD.

In the floating diffusion region FD, the source follower SF may be controlled according to the amount of light. The source follower SF that is a buffer amplifier may buffer signals according to the electric charges accumulated in the floating diffusion region FD. The source follower SF may amplify a change in electric potentials in the floating diffusion region FD and may output the amplified change as the pixel signal VOUT to the column output line CLO.

A drain terminal of the select transistor SX may be connected to a source terminal of the source follower SF and may output the pixel signal VOUT to a CDS (e.g., 151 of FIG. 2) through a column output line in response to the selection signal SELS.

According to the operation mode, operating timings of the first through i-th pixels PX1 through PXi may vary. For example, in the first operation mode, each of the first through i-th pixels PX1 through PXi may sequentially output the pixel signal VOUT sequentially so that the first image data IDTa1 described with reference to FIG. 8A may be generated by the image sensor. According to another example embodiment, for example, in the second operation mode, some of the first through i-th pixels PX1 through PXi may simultaneously output the pixel signal VOUT, and the other of the first through i-th pixels PX1 through PXi may simultaneously output the pixel signal VOUT so that the second image data IDTa2 described with reference to FIG. 10 may also generated by the image sensor. According to another example embodiment, for example, in the third operation mode, all of the first through i-th pixels PX1 through PXi may simultaneously output the pixel signal VOUT so that the third image data IDTa3 described with reference to FIG. 12 may also be generated by the image sensor.

Figure 14:
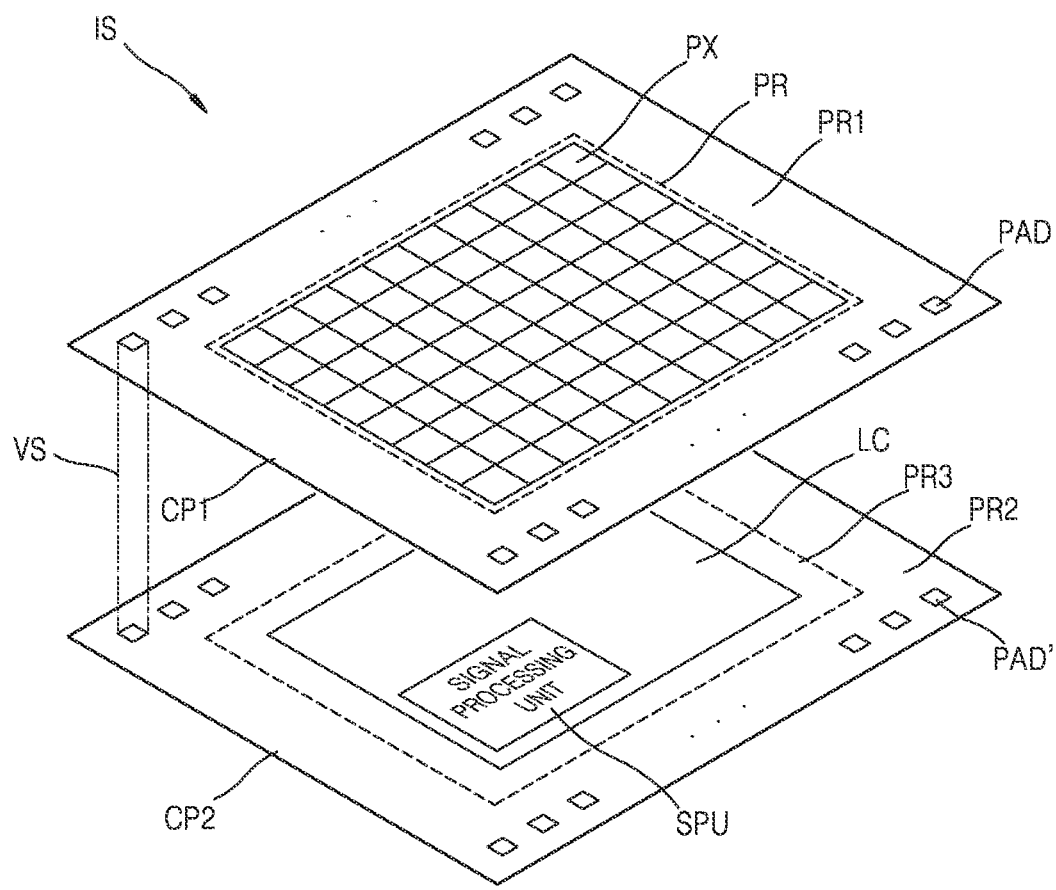
FIG. 14 is illustrates an image sensor according to an example embodiment.

FIG. 14 is a schematic diagram of the image sensor IS according to an example embodiment.

Referring to FIG. 14 the image sensor IS may be a stack-type image sensor including a first chip CP1 and a second chip CP2, which are stacked in a vertical direction. The image sensor IS may be implemented by the image sensor 100 described with reference to FIG. 2.

The first chip CP1 may include a pixel region PR and a pad region PR1, and the second chip CP2 may include a peripheral circuit region PR3 and a lower pad region PR2. In the pixel region PR, a pixel array in which a plurality of pixels PX are arranged, may be formed, and the pixel arrays 110, 110a, 110b, and 110c described with reference to FIGS. 3A through 3D may be included.

The peripheral circuit region PR3 of the second chip CP2 may include a logic circuit block LC and may include a plurality of transistors. The peripheral circuit region PR3 may provide a certain signal to each of the plurality of pixels PX included in the pixel region PR and may read a pixel signal output from each of the plurality of pixels PX.

The logic circuit block LC may include a signal processing unit SPU. The signal processing unit SPU may correspond to the signal processing unit 130 of FIG. 2. Because the image sensor IS according to the example embodiment includes the signal processing unit 130 in which the remosaic processing operation is simplified, the area of the second chip CP2 disposed below the signal processing unit 130 may be reduced.

The lower pad region PR2 of the second chip CP2 may include a lower conductive pad PAD'. The lower conductive pad PAD' may be plural, and they may each correspond to the conductive pad PAD. The lower conductive pad PAD' may be electrically connected to a conductive pad PAD of the first chip CP1 by a via structure VS.

Figure 15:
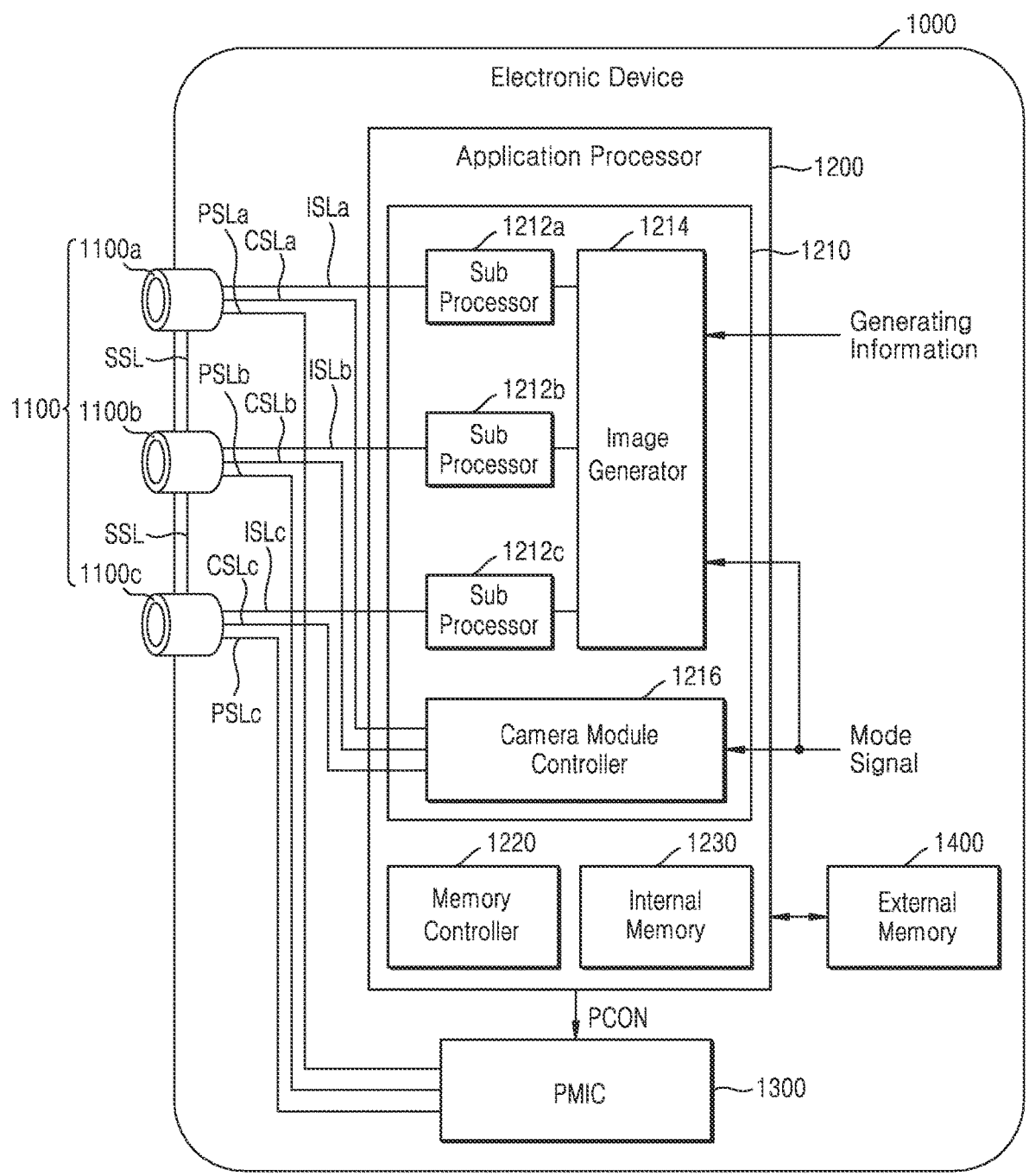
FIG. 15 is a block diagram of an electronic device including a multi-camera module.
Figure 16:
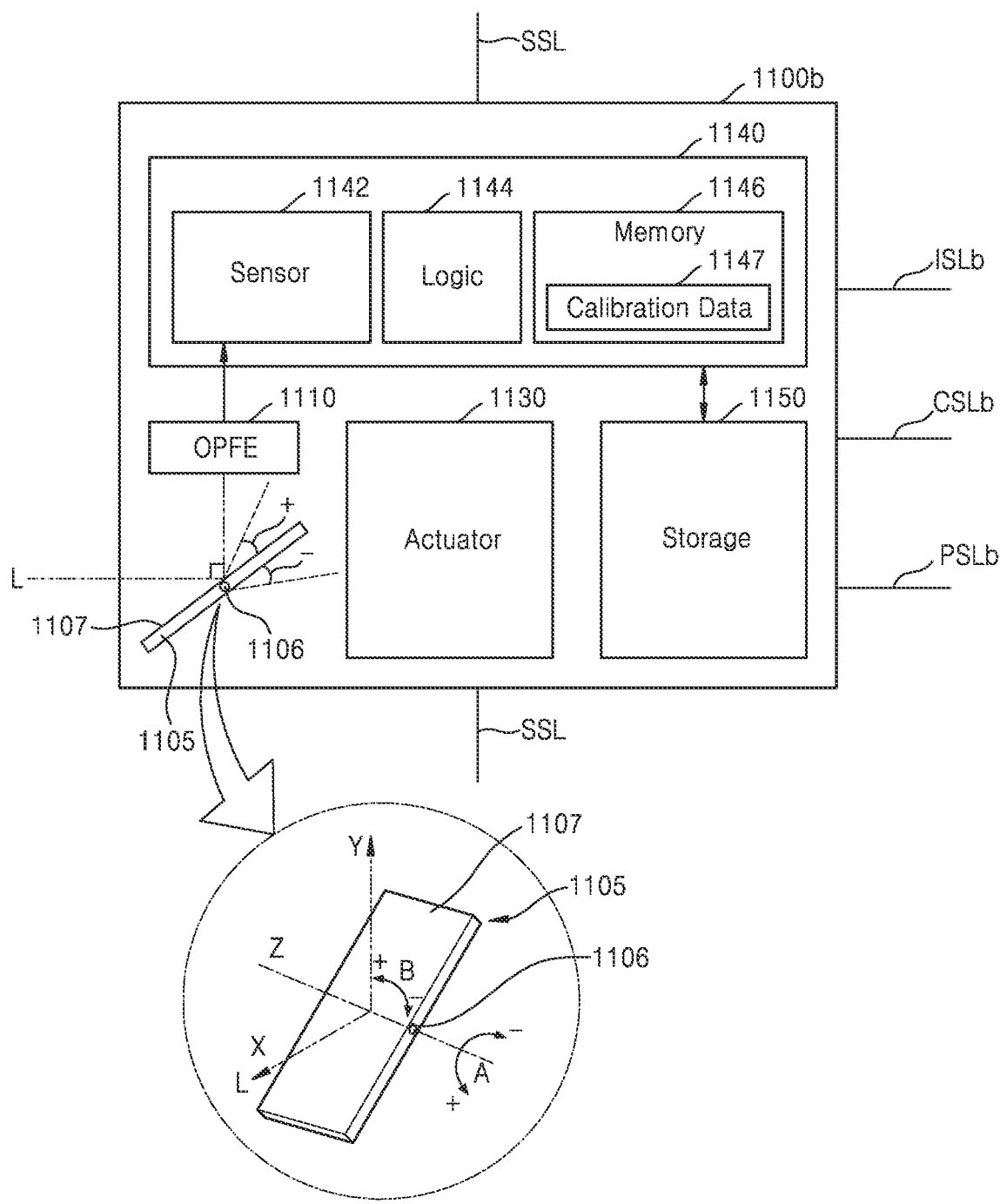
FIG. 16 is a detailed block diagram of a camera module of FIG. 15.

FIG. 15 is a block diagram of an electronic device including a multi-camera module. FIG. 16 is a detailed block diagram of a camera module of FIG. 15. FIG. 16 illustrates the detailed configuration of a camera module 1100b. However, the following description may be equally applied to the other camera modules 1100a and 1100c according to an example embodiment.

Referring to FIG. 15, an electronic device 1000 may include a camera module group 1100, an application processor 1200, a power management integrated circuit (PMIC) 1300, and an external memory 1400. The camera module group 1100 may include the camera modules 1100a, 1100b, and 1100c. Although an example embodiment in which three camera modules 1100a, 1100b and 1100c are arranged, is shown in the drawing, embodiments are not limited thereto.

Referring to FIGS. 15 and 16, the camera module 1100b may include a prism 1105, an optical path folding element (OPFE) 1110, an actuator 1130, an image sensing apparatus 1140, and a storage 1150.

The prism 1105 may include a reflective surface 1107 of a light reflective material to modify a path of light L incident from the outside. For example, the OPFE 1110 may include an optical lens including m groups, where, m is a natural number. The actuator 1130 may move the OPFE 1110 or an optical lens (hereinafter, referred to as an optical lens) to a certain position.

The image sensing apparatus 1140 may include an image sensor 1142, a control logic 1144, and a memory 1146. The image sensor 1142 may sense an image to be sensed by using light L provided through the optical lens. In the example embodiment, the image sensor 1142 may be the image sensor 100 described with reference to FIGS. 1 and 2, and may include at least one of the pixel arrays 110, 110a, 110b, and 110c described with reference to FIGS. 3A through 3D. The image sensor 1142 may perform the image processing operation described with reference to FIGS. 4 and 5.

The control logic 1144 may control an overall operation of the camera module 1100b. For example, the control logic 1144 may control an operation of the camera module 1100b according to a control signal provided through a control signal line CSLb.

In the example embodiment, one camera module (for example, camera module 1100b) of the plurality of camera modules 1100a, 1100b, and 1100c may be a camera module having a shape of a folded lens including the prism 1105 and the OPFE 1110 described above, and the remaining camera modules (for example, camera modules 1100a and 1100b) may be camera modules having a vertical shape in which the prism 1105 and the OPFE 1110 are not included. However, embodiments are not limited thereto.

In the example embodiment, one camera module (for example, camera module 1100c) of the plurality of camera modules 1100a, 1100b, and 1100c may be a depth camera having a vertical shape for extracting depth information by using an infrared ray (IR). In this case, the application processor 1200 may merge an image data value provided from the depth camera with an image data value provided from another camera module (for example, camera modules 1100a or 1100b) to generate a three-dimensional (3D) depth image.

In the example embodiment, at least two camera modules (for example, camera modules 1100a and 1100b) of the plurality of camera modules 1100a, 1100b, and 1100c may have different field of views. In this case, for example, optical lenses of at least two camera modules (for example, camera modules 1100a and 1100b) of the plurality of camera modules 1100a, 1100b, and 1100c may be different from each other. However, embodiments are not limited thereto.

In addition, in the example embodiment, field of views of the plurality of camera modules 1100a, 1100b, and 1100c may be different from each other. In this case, optical lenses respectively included in the plurality of camera modules 1100a, 1100b, and 1100c may be different from each other. However, embodiments are not limited thereto.

In the example embodiment, the camera modules 1100a, 1100b, and 1100c may be physically separated from each other. For example, the plurality of camera modules 1100a, 1100b, and 1100c may not split a sensing region of one image sensor 1142, but an independent image sensor 1142 may be disposed inside each of the plurality of camera modules 1100a, 1100b, and 1100c.

Referring back to FIG. 15, the application processor 1200 may include an image processing apparatus 1210, a memory controller 1220, and an internal memory 1230. The application processor 1200 may be separated from the plurality of camera modules 1100a, 1100b, and 1100c. For example, the application processor 1200 and the plurality of camera modules 1100a, 1100b, and 1100c may be separated from each other by an additional semiconductor chip.

The image processing apparatus 1210 may include a plurality of sub image processors 1212a, 1212b, and 1212c, an image generator 1214, and a camera module controller 1216. In the example embodiment, the image processing apparatus 1210 may be the image processing apparatus 200 of FIG. 1 and may perform the image processing operation described with reference to FIGS. 4 and 5.

The image processing apparatus 1210 may include the same number of sub image processors, for example, the sub image processors 1212a, 1212b, and 1212c, as the same number of camera modules, for example, the camera modules 1100a, 1100b, and 1100c.

Image data values generated from each of the camera modules 1100a, 1100b, and 1100c may be provided to respectively correspond to the sub image processors 1212a, 1212b, and 1212c through the separated image signal lines ISLa, ISLb, and ISLc. For example, an image data value generated from the camera module 1100a may be provided to the sub image processor 1212a through the image signal line ISLa, and an image data value generated from the camera module 1100b may be provided to the sub image processor 1212b through the image signal line ISLb, and an image data value generated from the camera module 1100c may be provided to the sub image processor 1212c through the image signal line ISLc. Transmission of the image data values may be performed using a camera serial interface (CSI) based on a mobile industry processor interface (MIPI), for example. However, embodiments are not limited thereto.

An image data value provided to each of the sub image processors 1212a, 1212b, and 1212c may be provided to the image generator 1214. The image generator 1214 may generate an output image by using the image data provided from each of the sub image processors 1212a, 1212b, and 1212c according to image generating information or a mode signal.

In detail, the image generator 1214 may merge at least a portion of image data values generated from the camera modules 1100a, 1100b, and 1100c having different field of views according to the image generating information or the mode signal to generate an output image. In addition, the image generator 1214 may select one among the image data values generated from the camera modules 1100a, 1100b, and 1100c having different field of views according to the image generating information or the mode signal to generate an output image.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through the separated control signal lines CSLa, CSLb, and CSLc.

The application processor 1200 may store the received image data values, i.e., encoded data in the memory 1230 provided inside the application processor 1200 or the external storage 1400 outside the application processor 1200, and subsequently may read the encoded data from the memory 1230 or the external storage 1400 to decode the read data and may display an image generated based on the decoded image data value. For example, a corresponding sub processor among the plurality of sub processors 1212a, 1212b, and 1212c of the image processing apparatus 1210 may perform decoding, and may perform image processing on the decoded image data value.

The PMIC 1300 may supply power, for example, a power supply voltage to each of the plurality of camera modules 1100a, 1100b, and 1100c. For example, the PMIC 1300 may supply first power to the camera module 1100a through a power signal line PSLa under control of the application processor 1200, supply second power to the camera module 1100b through the power signal line PSLb, and supply third power to the camera module 1100c through the power signal line PSLc.

At least one of the components, elements, modules or units (collectively "components" in this paragraph) represented by a block in the drawings, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like While example embodiments been particularly shown and described, it will be understood that various changes in form and details may be made therein without departing from the spirit and scope of the following claims.

What is claimed is:

1. An image sensor comprising:
a pixel array comprising a plurality of pixels arranged in a plurality of rows and a plurality of columns; and
a signal processor configured to process first image data generated by the pixel array to generate a plurality of pieces of first full color image data,
wherein the signal processor is further configured to:
split the first image data into a plurality of pieces of phase data;
remosaic-process each of the plurality of pieces of phase data to generate a plurality of pieces of color phase data;
merge the plurality of pieces of color phase data corresponding to a same color, respectively, to generate a plurality of pieces of preliminary color data; and
compensate for the plurality of pieces of preliminary color data to generate the plurality of pieces of first full color image data, and
wherein the signal processor is further configured to generate the plurality of pieces of first full color image data by:
splitting each of the plurality of pieces of preliminary color data into a smooth image and a detail image;
removing an error from the detail image; and
adding the smooth image to the detail image from which the error is removed.

2. The image sensor of claim 1, wherein the pixel array comprises a plurality of pixel groups, each of the plurality of pixel groups comprising 16 pixels arranged in four adjacent rows and four adjacent columns and a corresponding color filter, and
wherein the first image data output from the pixel array has a hexadeca pattern.

3. The image sensor of claim 2, wherein the signal processor is further configured to sample the first image data as first through second phase data of a tetra pattern to split the first image data into the plurality of pieces of phase data.

4. The image sensor of claim 2, wherein each of the plurality of pixel groups comprises a plurality of micro lenses respectively provided on each of four pixels among pixels included in each of the plurality of pixel groups.

5. The image sensor of claim 2, wherein each of the plurality of pixel groups comprises one micro lens.

6. The image sensor of claim 1, wherein the signal processor is further configured to process second image data generated by the pixel array to generate a plurality of pieces of second full color data, and
wherein the first image data has a $(2n)\times(2n)$ matrix pattern, and the second image data has an $(n)\times(n)$ matrix pattern, where n is a natural number.

7. The image sensor of claim 6, wherein the signal processor is further configured to demosaic-process third image data generated by the pixel array to generate a plurality of pieces of third full color image data, and
wherein the third image data has an $(n/2)\times(n/2)$ matrix pattern.

8. The image sensor of claim 1, wherein the pixel array is provided on a first chip, and the signal processor is provided on a second chip on which the first chip is provided.

9. An image processing apparatus comprising a signal processor configured to process first image data of a $(2n)\times(2n)$ matrix pattern output from an image sensor, where n is a natural number,
wherein the signal processor is configured to:
split the first image data into a plurality of pieces of phase data;
remosaic-process each of the plurality of pieces of phase data to generate a plurality of pieces of color phase data;
merge the plurality of pieces of color phase data corresponding to a same color, respectively, to generate a plurality of pieces of preliminary color data; and compensate for the plurality of pieces of preliminary color data to generate a plurality of pieces of first full color image data, and wherein the signal processor is further configured to generate the plurality of pieces of first full color image data by:

generating smooth images from each of the plurality of pieces of preliminary color data;

removing an error of detail images from which the smooth images are removed, from each of the plurality of pieces of preliminary color data; and adding the smooth images to the detail images from which an error is removed.

10. The image processing apparatus of claim 9, wherein the signal processor is further configured to sample the first image data as first through fourth phase data of an (n)×(n) matrix pattern to split the first image data into the plurality of pieces of phase data.

11. The image processing apparatus of claim 9, wherein the signal processor is further configured to remove a signal having a repeated pattern from the detail images.

12. The image processing apparatus of claim 9, wherein the signal processor is further configured to receive second image data of an (n)×(n) matrix pattern output from the image sensor to generate a plurality of pieces of second full color image data.

13. The image processing apparatus of claim 9, wherein the plurality of pieces of first full color image data comprise red color data, green color data, and blue color data, and each of the red color data, the green color data, and the blue color data comprises data of a (2n)×(2n) matrix pattern.

14. An image processing method comprising:

splitting image data into a plurality of pieces of phase data;

remosaic-processing each of the plurality of pieces of phase data to generate a plurality of pieces of color phase data;

merging the plurality of pieces of color phase data corresponding to a same color to generate a plurality of pieces of preliminary color data; and compensating for the plurality of pieces of preliminary color data to generate a plurality of pieces of full color image data, wherein the generating the plurality of pieces of full color image data comprises:

splitting each of the plurality of pieces of preliminary color data into a smooth image and a detail image;

removing an error from the detail image; and adding the detail image from which the error is removed, to the smooth image.

15. The image processing method of claim 14, wherein the generating the plurality of pieces of phase data comprises generating first phase data, second phase data, third phase data, and fourth phase data respectively having a size of ¼ of a size of the image data.

16. The image processing method of claim 14, wherein the removing the error comprises removing a signal having a repeated pattern from the detail image.

17. The image processing method of claim 14, wherein the image data has a tetra pattern.

* * * * *